US012028399B2

(12) United States Patent
Yu

(10) Patent No.: US 12,028,399 B2
(45) Date of Patent: Jul. 2, 2024

(54) MOTION-BASED FRAME RATE ADJUSTMENT FOR NETWORK-CONNECTED CONFERENCE PARTICIPANTS

(71) Applicant: Zoom Video Communications, Inc., San Jose, CA (US)

(72) Inventor: Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 193 days.

(21) Appl. No.: 17/589,165

(22) Filed: Jan. 31, 2022

(65) Prior Publication Data

US 2023/0275952 A1  Aug. 31, 2023

(51) Int. Cl.
*H04L 65/80* (2022.01)
*H04L 65/403* (2022.01)
*H04L 65/75* (2022.01)
*H04N 5/14* (2006.01)

(52) U.S. Cl.
CPC ............ *H04L 65/80* (2013.01); *H04L 65/403* (2013.01); *H04L 65/762* (2022.05); *H04N 5/145* (2013.01)

(58) Field of Classification Search
CPC ..... H04L 65/80; H04L 65/403; H04L 65/762; H04L 65/4015; H04L 65/75; H04N 5/145; H04N 7/0127; H04N 7/15; H04N 5/14; H04M 3/568
See application file for complete search history.

(56) References Cited

U.S. PATENT DOCUMENTS

| 7,558,199 B1 * | 7/2009 | Minei ..................... H04L 45/50 370/468 |
| 7,710,450 B2 | 5/2010 | Dhuey et al. |
| 8,437,398 B2 | 5/2013 | Shin et al. |
| 8,483,055 B2 | 7/2013 | Gan et al. |
| 8,692,934 B2 | 4/2014 | MacInnis |

(Continued)

FOREIGN PATENT DOCUMENTS

WO   2016046589 A1   3/2016

OTHER PUBLICATIONS

International Search Report and Written Opinion mailed on May 19, 2023 in corresponding PCT Application No. PCT/US2023/011781.

(Continued)

*Primary Examiner* — Yosef K Laekemariam
(74) *Attorney, Agent, or Firm* — Young Basile Hanlon & MacFarlane, P.C.

(57) ABSTRACT

During a conference, a first video stream is obtained from a first participant device connected to a local area network and a second video stream is obtained from a second participant device connected to the local area network. A first frame rate is determined for the first participant device to use based on information particular to the first video stream and based on a network constraint associated with the local area network. A second frame rate is determined for the second participant device to use based on information particular to the second video stream and based on the network constraint associated with the local area network. The first participant device and the second participant device are then instructed, during the conference, to respectively capture the first video stream at the first frame rate and the second video stream at the second frame rate.

20 Claims, 12 Drawing Sheets

(56) References Cited

U.S. PATENT DOCUMENTS

| | | |
|---|---|---|
| 8,842,161 B2 | 9/2014 | Feng et al. |
| 9,325,940 B2 | 4/2016 | Smelyansky |
| 10,187,607 B1 | 1/2019 | Delachanal |
| 10,609,440 B1 | 3/2020 | Wu et al. |
| 11,165,992 B1 | 11/2021 | Ong et al. |
| 2002/0101505 A1 | 8/2002 | Gutta et al. |
| 2009/0144756 A1 | 6/2009 | Inami |
| 2010/0171807 A1 | 7/2010 | Tysso |
| 2016/0007047 A1 | 1/2016 | Hosseini |
| 2017/0085790 A1* | 3/2017 | Bohn .................... H04N 23/90 |
| 2017/0280098 A1* | 9/2017 | Sethuraman ........ H04L 12/1827 |
| 2019/0007623 A1 | 1/2019 | Wang et al. |
| 2021/0377428 A1 | 12/2021 | Nakai |
| 2023/0069324 A1 | 3/2023 | Ifrach et al. |

OTHER PUBLICATIONS

Motion-based Adaptive Streaming in WebRTC using Spatio-Temporal Scalable VP9 Video Coding, Gonca Bakar et al., Department of Electrical and Electronics Engineering, Koc University, Nov. 2021, 6 pages.

* cited by examiner

US 12,028,399 B2

MOTION-BASED FRAME RATE ADJUSTMENT FOR NETWORK-CONNECTED CONFERENCE PARTICIPANTS

FIELD

This disclosure generally relates to motion-based frame rate adjustment for video streams output for rendering within a software user interface.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
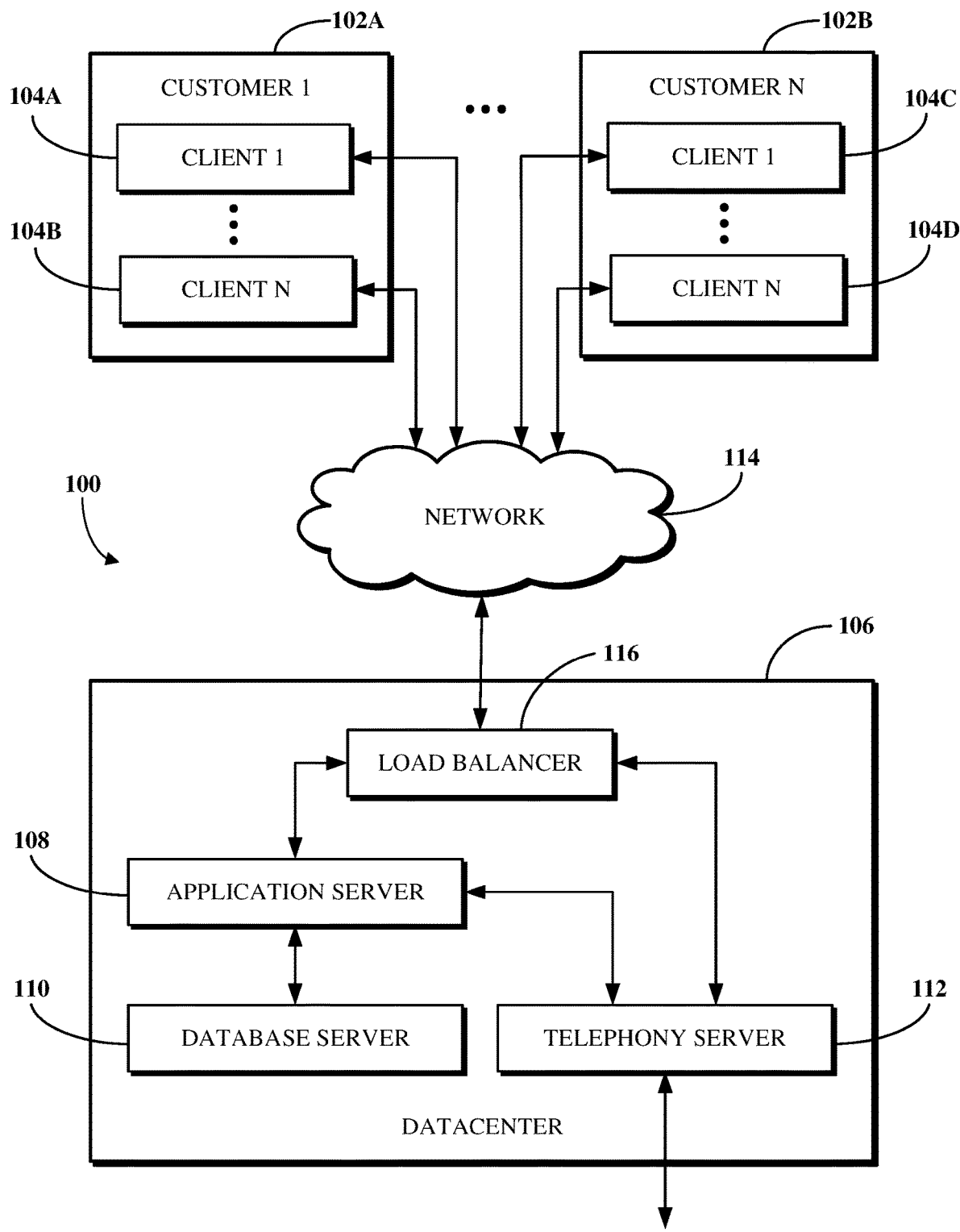
FIG. 1 is a block diagram of an example of an electronic computing and communications system.

Conferencing software is frequently used across various industries to support conferences between participants in multiple locations. In many cases, one or more of the conference participants is physically located in and connects to the conferencing software from a conference room (e.g., in an office setting), and other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

In many cases, conferencing software uses video media to output, in real-time, video streams captured from endpoints connected to the conferencing software. For people physically present within a physical space, such as a conference room, a computing device within the physical space serves as the endpoint. Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are typically connected to the computing device within the conference room, which transmits streams thereof to a server that implements the conferencing software. The conferencing software then renders an output video stream based on the video feed from the camera within a user interface of the conferencing software (e.g., within a user interface tile associated with the conference room) and introduces an audio feed from the one or more microphones within an audio channel of the conference.

A user interface of conventional conferencing software includes a number of user interface tiles in which video feeds received from the various connected devices are separately rendered. Conference participants remotely connecting to conventional conferencing software are represented within a user interface of the conferencing software using individualized user interface tiles based on the video feeds received from their devices. In contrast, because a single video feed is received from the camera within a conference room, conference participants who are physically located within the conference room generally are all represented within the same user interface tile. However, the use of a single user interface tile to show all participants within a conference room may limit the contribution that those participants have to the overall conference experience over the conferencing software. For example, a conference participant located somewhere in the conference room will not be given the same amount of focus within the user interface of the conferencing software, which includes all of the user interface tiles, as someone who is front and center within their own individualized user interface tile. In another example, conversations between participants within the conference room may be missed or misattributed to others by remote participants who are not present in the conference room.

One solution uses a system for processing a video stream received from a camera within a physical space, such as a conference room, to identify multiple people within that video stream. The system may perform object detection looking for humans within input video streams and determine one or more regions of interest within the conference room as the output of that object detection. Each region of interest generally corresponds to one person. The system then separates each person, based on their region of interest, into their own dedicated user interface tile and causes video data for those people to be rendered within their respective user interface tiles within the conferencing software user interface. Individually representing each participant within the conference room has certain benefits, including enabling better communications between remote participants and individual participants within the conference room and enabling better visibility of those participants within the conference room for remote participants.

However, this approach still suffers a drawback in that video streams rendered within the user interface tiles separated out from an input video stream are generally captured at a same frame rate and subject to the same frame rate constraints for video capture. In particular, the above approach does not feature the adjustment of frame rate controls for individual video streams captured based on the processing of a single initial video stream. As a result, in many cases, the output video streams are displayed to conferencing software users with inconsistent quality based on the degree and frequency of motion variation between the participants within the conference room or other physical space. For example, where a first participant in a first output video stream is a frequent mover and a second participant in a second output video stream rendered directly next to the first output video stream rarely moves, a common frame rate used to capture both of those video streams may cause the movement of the first participant to appear choppy to a remote user. However, increasing the frame rate for all output video streams may constrain compute and/or network resources.

Implementations of this disclosure address problems such as these using motion-based frame rate adjustment. Motion-based frame rate adjustment generally refers to the determined increase or decrease of frame rates used to capture video streams for rendering within user interface tiles of a conferencing software user interface. In some cases, motion-based frame adjustment may be performed for in-person conference participants. For example, a video capture device within a physical space, such as a conference room, may capture an initial video stream within which multiple regions of interest, each corresponding to one or more conference participants within the physical space, are identified. Frame rates can be determined for each of those regions of interest, and then video streams captured for each of those regions of interest at the subject frame rates may be output for rendering within a software user interface. In some cases, motion-based frame adjustment may be performed for network-connected conference participants. For example, separate participant devices connected to a same local area network may be used to capture video streams at an initial frame rate. Adjustments to those frame rates can be determined based on information particular to those video streams and network constraints associated with the local area network. The participant devices may then be instructed to capture the video streams at the respective adjusted frame rates, and the captured video streams may be output for rendering within a software user interface.

Figure 6:
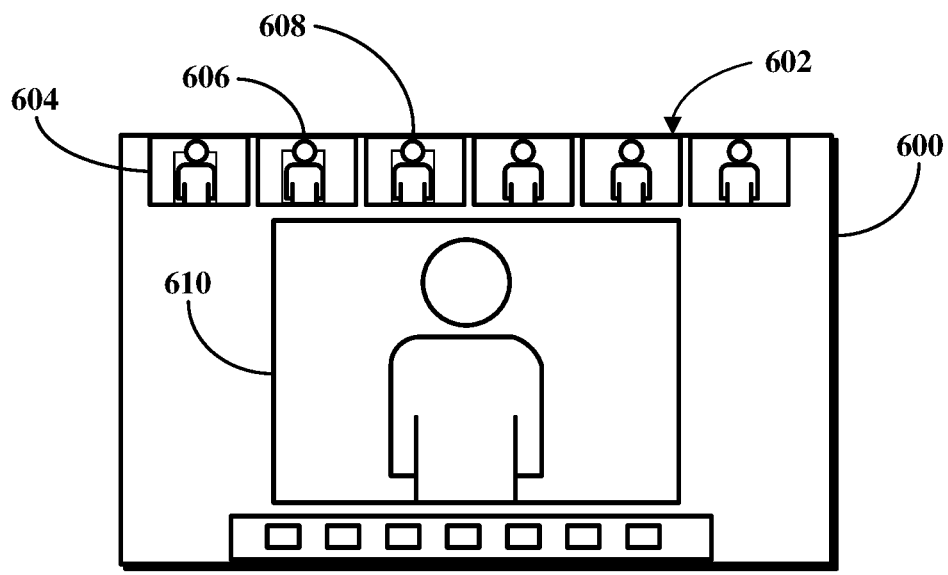
FIG. 6 is an illustration of examples of user interface tiles of a software user interface within which video streams captured for regions of interest are output.

As used herein, a "user interface tile" refers to a portion of a conferencing software user interface which displays a rendered video showing one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. Examples of user interface tiles are shown in FIG. 6.

To describe some implementations in greater detail, reference is first made to examples of hardware and software structures used to implement a system for motion-based frame rate adjustment for video streams output for rendering within a software user interface. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
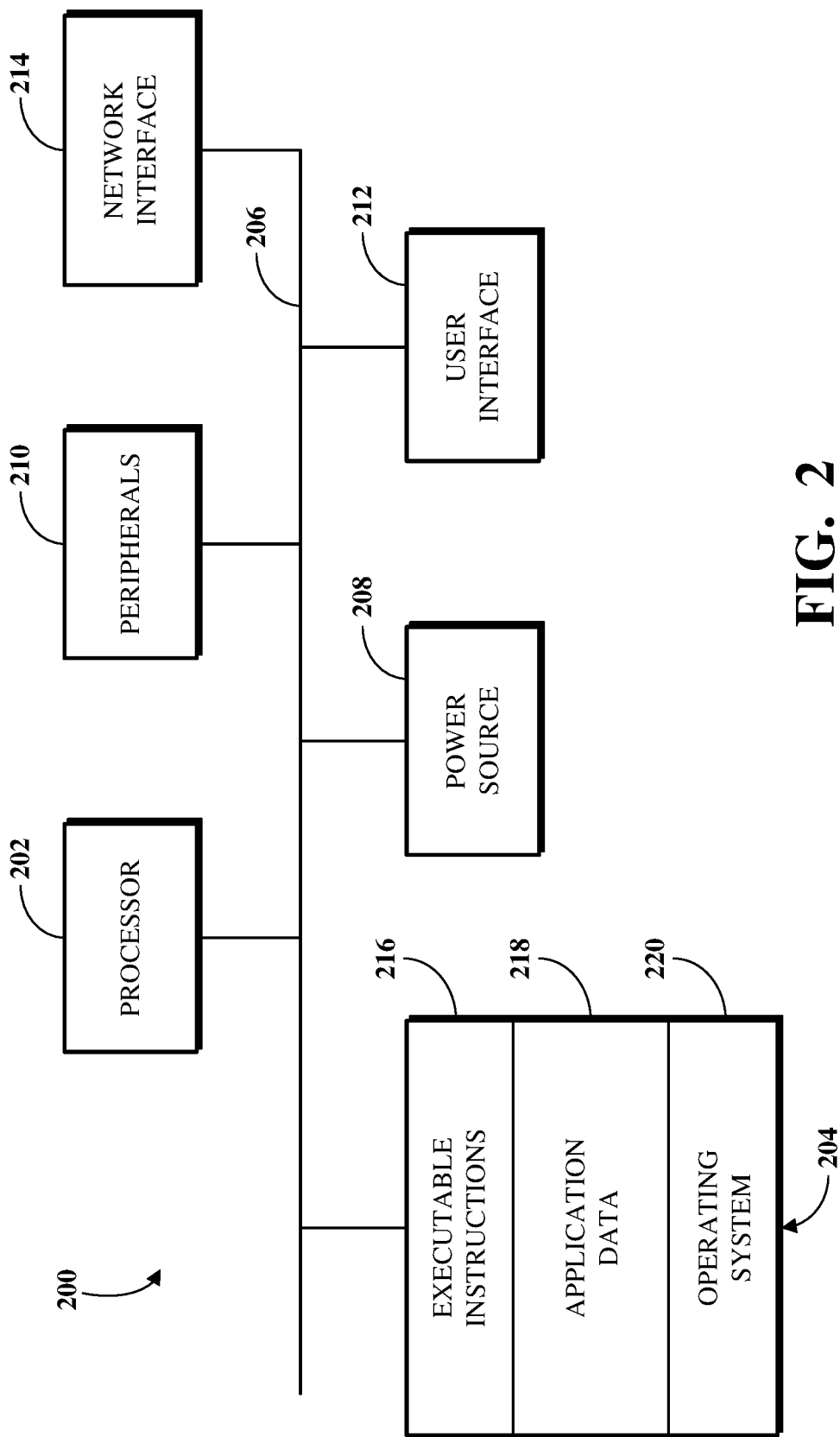
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
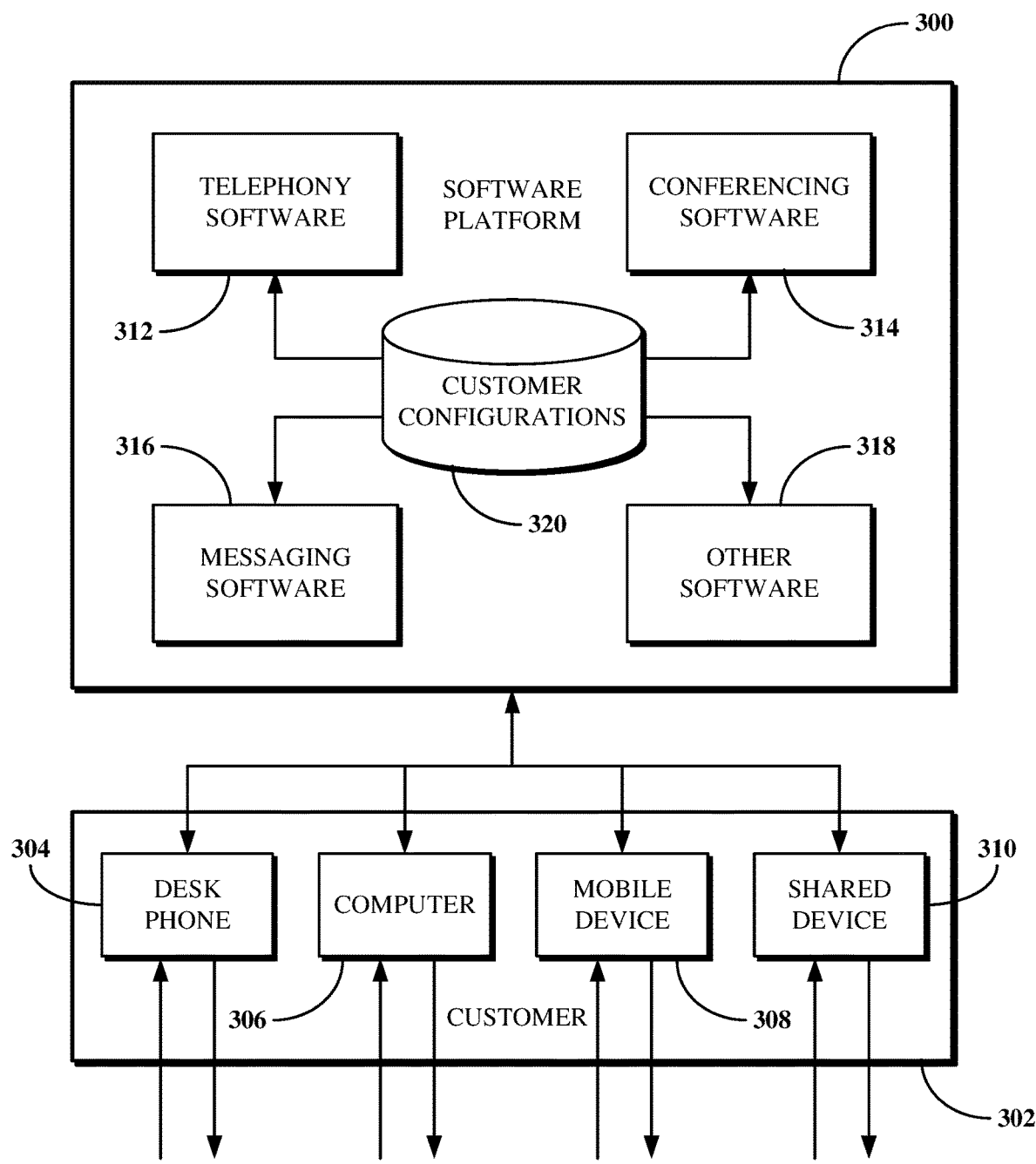
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for motion-based frame rate adjustment for video streams output for rendering within a software user interface. In some such implementations, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
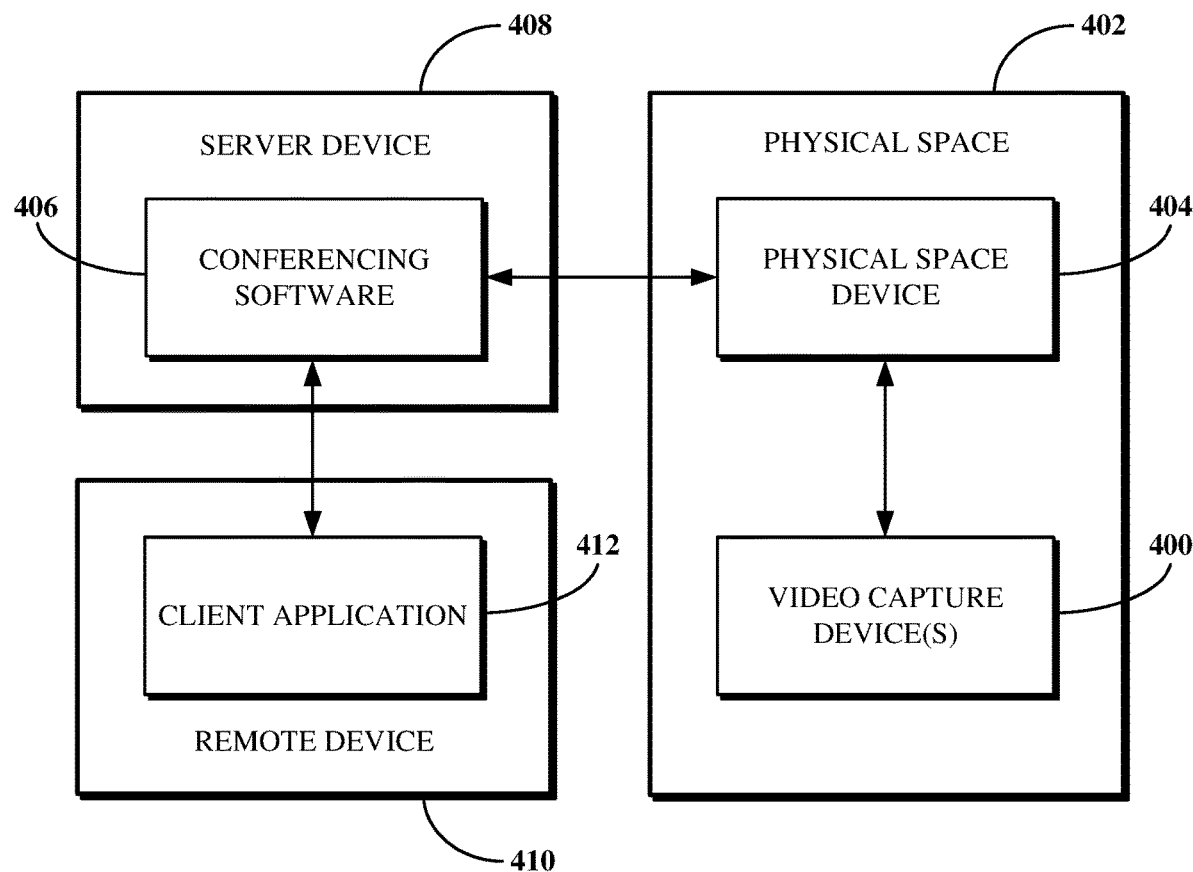
FIG. 4 is a block diagram of an example of a conferencing system.

FIG. 4 is a block diagram of an example of a conferencing system. One or more video capture devices 400 are used to capture video within a physical space 402 in which one or more conference participants are physically located during at least a portion of a conference. For example, the physical space 402 may be a conference room. The one or more video capture devices 400 are cameras configured to record video data within the physical space 402. In one example, a single video capture device 400 may be arranged on a wall of the physical space 402. In another example, a first video capture device 400 may be arranged on a first wall of the physical space 402 and a second video capture device 400 may be arranged on a second wall of the physical space 402 perpendicular to the first wall. However, any number of video capture devices 400 may be arranged on any number of walls of the physical space 402.

Each video capture device 400 has a field of view within the physical space 402 based on an angle and position of the video capture device 400. The video capture devices 400 may be fixed such that their respective fields of view do not change. Alternatively, one or more of the video capture devices 400 may have mechanical or electronic pan, tilt, and/or zoom functionality for narrowing, broadening, or changing the field of view thereof. For example, the pan, tilt, and/or zoom functionality of a video capture device 400 may be electronically controlled, such as by a device operator or by a software intelligence aspect, such as a machine learning model or software which uses a machine learning model for field of view adjustment. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

A physical space device 404, which is a computing device associated with the physical space 402, is in communication with a video capture device 400 (e.g., with each of the video capture devices 400). The physical space device 404 thus may be located within the physical space 402. Alternatively, the physical space device 404 may be located external to the physical space 402. For example, the physical space device 404 may be a client device, such as one of the client devices 304 through 310 shown in FIG. 3, which runs a client application which connects to conferencing software 406 at a server device 408. The physical space device 404 runs software configured to process video streams captured by a video capture device 400 for use with a conference. The communication with the video capture device 400 may be over wired (e.g., USB or ethernet) or wireless (e.g., Wi-Fi or Bluetooth) means. In some implementations, the physical space device 404 may include the video capture device 400. For example, rather than be a peripheral connected to the physical space device 404 over wired or wireless means, the video capture device 400 may be integrated within the physical space device 404. In one such example, the video capture device 400 may be a built-in front- or rear-facing camera of the physical space device 404.

The conferencing software 406, which may, for example, be the conferencing software 314 shown in FIG. 3, processes video streams obtained from various devices connected to the conferencing software 406 and transmits the processed video streams to those various devices for output thereat. In particular, video streams transmitted for output from the server device 404 may be rendered within a software user interface at the various devices connected to the conferencing software 406, including, for example, a client device 410. For example, the client device 410 may be a device located remotely from the physical space 402 which runs a client application 412. The client application 412 may receive the video streams from the server 404 and render them for display to a user thereof. The conferencing software 406 thus implements a conference with two or more participants in which one or more of those participants are in the physical space 402 and one or more of those participants are remote participants located external to the physical space 402.

Software running at the physical space device 404, for example, adaptive frame rate software, adaptively determines frame rates for regions of interest of an initial video stream captured by a video capture device 400 and for causing a capture of video streams associated with each of the regions of interest at the adaptive frame rates. Adaptive frame rate determination refers to the determination of frame rates for regions of interest of a video stream based on video content of those regions of interest, and, in particular, based on motion information associated with that video content.

Without this adaptive frame rate determination, all video streams captured for regions of interest of an initial video stream may be captured at a same (e.g., default or defined) frame rate. However, motion information may indicate that the video quality for a given region of interest would be improved by an increased frame rate. For example, the quality of a video stream captured for a region of interest corresponding to a conference participant who frequently moves may be improved by a higher frame rate being used therefor. However, increased frame rates demand increased compute and/or network resources (e.g., based on the required capture of additional video frames within the subject video stream), and compute and/or network bandwidth constraints limit the amount by which frame rates can be increased and/or the number of video streams for which frame rates may be increased. As such, the adaptive frame rate software determines the frame rates for the regions of interest based on the relative motion of the video content of the regions of interest. Referring back to the above example in which a first conference participant who frequently moves is associated with a first region of interest, a second conference participant who moves very little may be associated with a second region of interest. In this case, the adaptive frame rate software may determine to increase the frame rate for the first region of interest and decrease the frame rate for the second region of interest, such as to both improve the overall video quality for the conference and to preserve the total of compute and/or network resources spent on frame rate for the rendered video streams.

The adaptive frame rate software may in some cases communicate with video stream capture software running at the video capture device 400. For example, the adaptive frame rate software may obtain an initial video stream and metadata associated with the initial video stream from the video capture device 400, determine frame rates at which to capture video streams for each region of interest determined within the initial video stream based on the metadata, and cause a capture of video streams associated with the regions of interest at those determined frame rates. For example, the video capture device 400 may use the video stream capture software to capture the video streams associated with the regions of interest at the determined frame rates and transmit those video streams to the adaptive frame rate software or otherwise to a client application running at the physical space device 404 for processing. In another example, the video capture device 400 may use the video stream capture software to capture the video streams at an initial frate rate and transmit those video streams to the adaptive frame rate software or otherwise to a client application running at the physical space device 404, which can adjust the frame rate for each of the video streams according to the frame rates determined therefor.

In particular, the video streams captured by the video capture device 400 based on the adaptive frame rate determination performed for those video streams are rendered within a user interface of the conferencing software 406 at one or more devices connected to the conferencing software 406. The video streams are at the determined frame rates (e.g., captured at those frame rates or adjusted thereto post-capture) so as to cause compute and/or network resources available for the conference implemented by the conferencing software 406 to be appropriately spent increasing the frame rates, and thus enhancing the video quality, of the video streams for certain ones of the regions of interest. Thus, the video streams for some of the conference participants within the physical space 402 may appear at higher frame rates than others based on the video content of the regions of interest corresponding to those conference participants.

The client application 412 is software which communicates with the conferencing software 406 to enable the user of the client device 410 to participate in the conference implemented using the conferencing software 406 as a remote participant. The client device 410 may, for example, be one of the clients 304 through 310. The client device 410 includes one or more capture components, such as a camera, which captures input (e.g., video data) that is then transmitted to the conferencing software 406 for presentation to connected devices within or otherwise through a user interface of the conferencing software 406. For example, an input video stream from the client device 410 may be processed and output within a user interface tile for the user of the client device 410 within the user interface of the conferencing software 406.

Each of the separate user interface tiles at which captured video streams are rendered represents one or more of the conference participants within the physical space 402. In some cases, where a field of view of a video capture device 400 includes only one conference participant, a stream of video data from that video capture device 400 can be rendered within a user interface tile for that conference participant. In other cases, where a field of view of a video capture device 400 includes multiple conference participants, a stream of video data from that video capture device can be processed to determine regions of interest corresponding to those conference participants within the physical space 402 based on that video data. For example, multiple regions of interest can be determined within a field of view of a video capture device 400 and video streams for rendering individual ones of those regions of interest within separate user interface tiles of the conferencing software 406 may accordingly be captured. The client application 412, upon receiving the video streams, renders the video streams within the respective user interface tiles for viewing at the client device 410.

A region of interest generally refers to an area in which a conference participant is visible within video data. A region of interest within the physical space 402 can be determined based on video data from the video capture devices 400 in one or more ways. In one example, a region of interest can be determined by processing an input video stream obtained from a video capture device 400 to detect a number of people, as conference participants, within the field of view of the video capture device 400, as well as the locations of those conference participants within the physical space 402. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content. One or more regions of interest determined from an input video stream from a single video capture device 400 may then be separately rendered in their own user interface tiles within the conferencing software 406. In another example, a region of interest can be determined by obtaining data indicative of the region of interest from the video capture device 400. For example, the video stream capture software running at the video capture device 400 can process the initial video stream captured using the video capture device 400 to determine the region of interest.

In some implementations, audio data captured within the physical space 402 may be used to determine the regions of interest to be represented within output video streams to render in user interface tiles of the conference software 406. For example, the audio data may be captured using one or more audio capture devices (e.g., microphones) within the physical space 402. The audio data may be processed to determine the directions from which the audio data arrives at the audio capture devices. For example, a machine learning model trained for voice activity detection or a similar tool can process the audio data to detect when the audio data includes human vocal sounds, such as from a person talking. Upon detecting voice activity within the audio data, a machine learning model trained for direction of arrival processing or a similar tool can process the audio data to determine directions of arrival indicating where the voice activity is coming from within the physical space 402. The directions of arrival may then be used to determine a conversational context within the physical space 402, and, more specifically, within a subject field of view of a video capture device 400 determined based on video data from the video capture device 400. The conversational context may, for example, correspond to a context and/or length of a conversation between two or more conference participants within the physical space 402. A region of interest within the subject field of view to feature within a user interface tile of the conferencing software 406 may then be based on the video data and the determined conversational context.

In some cases, multiple regions of interest may be determined for a single conference participant. For example, a conference participant may be included within the fields of view of two or more different video capture devices 400. In such a case, those multiple regions of interest may be treated as candidate regions of interest for the conference participant and evaluated to select one for use in an output video stream for rendering within a user interface tile representing the conference participant. The candidate regions of interest may be evaluated using a machine learning model trained for facial recognition such as by scoring detections of a face of the subject conference participant within each of the candidate regions of interest according to one or more factors. Examples of the factors may include, but are not limited to, a size of the face of the conference participant, a percentage of the face of the conference participant which is visible (e.g., due to the conference participant facing one video capture device 400 and not another or due to differences in lighting captured by the video capture devices 400), and the presence of other conference participants within a threshold distance of the face of the conference participant. A candidate region of interest having the highest score may be selected and used for processing and rendering within a user interface tile representing the conference participant.

In some implementations, the software for determining the adaptive frame rates for the regions of interest and for causing the capture of video streams according thereto may be at the server device 408 instead of at the physical space device 404. In some such implementations, the conferencing software 406 can include that software. In some implementations, the software for determining the adaptive frame rates for the regions of interest and for causing the capture of video streams according thereto may be at a server other than the server device 408. In some such implementations, the servers may be in communication with one another during the conference. Accordingly, the implementations of this disclosure may operate the software for determining the adaptive frame rates for the regions of interest and for causing the capture of video streams according thereto at the server-side or at the client-side. For example, a client-side implementation may process information to be sent to the conferencing software 406 at the physical space device 404, such as before it is sent to the conferencing software 406, and it may further process information received from the conferencing software 406 before that information is rendered using a client application running the physical space device 404. In another example, a server-side implementation may process information obtained from the one or more video capture devices 400 directly or indirectly (e.g., via the physical space device 404 or the client device 410 as an intermediary) at the server device 408 and transmit instructions from the server device 408 directly or indirectly to the one or more video capture devices.

Figure 5:
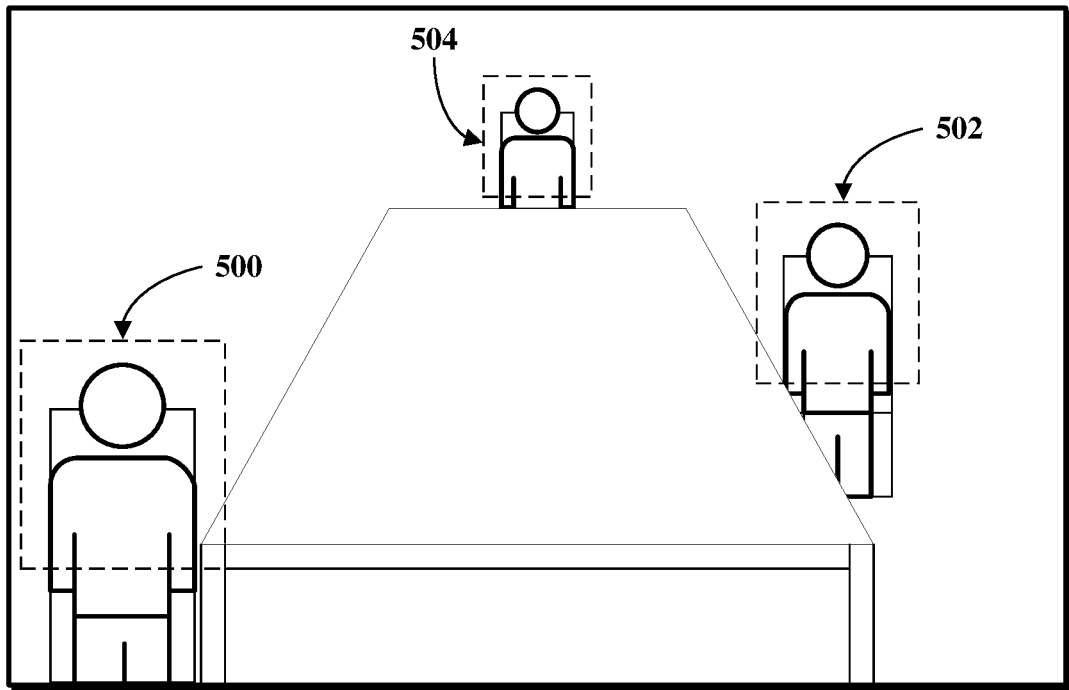
FIG. 5 is an illustration of an example of regions of interest of an initial video stream.

FIG. 5 is an illustration of an example of regions of interest of an initial video stream. Three conference participants are shown within a physical space, for example, the physical space 402 shown in FIG. 4. In the example shown, three conference participants are located around a conference room table and are facing a video capture device used to capture the initial video stream (e.g., one of the one or more video capture devices 400 shown in FIG. 4). For example, a front wall of the physical space which the three conference participants are facing may include the video capture device and a display at which a user interface of conferencing software (e.g., the conferencing software 406 shown in FIG. 4) is output. The initial video stream may be processed to determine three regions of interest 500, 502, and 504, in which the region of interest 500 corresponds to a first conference participant located on the left side of the conference room table relative to the video capture device, the region of interest 502 corresponds to a second conference participant located on the right side of the conference room table relative to the video capture device, and the region of interest 504 corresponds to a third conference participant located on a rear side of the conference room table relative to the video capture device.

The three conference participants may move in different amounts or at different rates during the conference, for example, based on their roles (e.g., discussion leader or audience member) and personal behaviors (e.g., someone who frequently moves or someone who remains very still). For example, the conference participant on the left side of the conference room table, who is closest to the video capture device, may be leading a discussion during the conference and may be frequently gesticulating, shaking their head, pointing, holding up objects, or the like. In another example, the conference participant in the back of the physical space may be an audience member who simply sits and listens without much movement detected. Without adaptive frame rate processing, video streams captured for the regions of interest of those two participants would be rendered at the same frame rate, which, subject to compute and/or network resources, may make the left-most participant's motions appear choppy to remote participants. However, using adaptive frame rate processing as disclosed herein, the video stream for that left-most participant may be rendered at a higher frame rate than the video stream for the participant sitting in the back given that the higher frame rate will be useful to fluidly represent the motions of that left-most participant and fewer resources will need to be spent for the participant sitting in the back.

FIG. 6 is an illustration of examples of user interface tiles of a software user interface 600 within which video streams captured for regions of interest are output. For example, the software user interface 600 may be a user interface of conferencing software, such as the conferencing software 406 shown in FIG. 4. The software user interface includes user interface tiles 602 associated with conference participants, in which some are remote conference participants and others are conference participants located within a physical space, such as the physical space 402 shown in FIG. 4. In particular, the user interface tiles 602 include a first user interface tile 604 at which a video stream captured for a first conference participant (e.g., the first conference participant associated with the region of interest 500 shown in FIG. 5) is output, a second user interface tile 606 at which a video stream captured for a second conference participant (e.g., the second conference participant associated with the region of interest 502 shown in FIG. 5) is output, and a third user interface tile 608 at which a video stream captured for a third conference participant (e.g., the third conference participant associated with the region of interest 504 shown in FIG. 5) is output. A large user interface tile 610 represents an active speaker at a given time during the conference.

The user interface tiles 604 through 608 represent conference participants within a physical space. In particular, the video streams are output within the user interface tiles 604 through 608 at frame rates adaptively determined for the regions of interest represented by the user interface tiles 604 through 608. Referring to the example in which the user interface tiles 604 through 608 respectively correspond to the first, second, and third conference participants referenced above in the discussion of FIG. 5, the frame rates determined for each of those participants' regions of interest differ based on the motion information determined for those regions of interest. In particular, per the above example, the video for the user interface tile 604 to which the first conference participant who frequently moves corresponds may be rendered with a highest frame rate of the three and the video for the user interface tile 608 to which the third conference participant who moves very little corresponds may be rendered with a lowest frame rate of the three.

Figure 7:
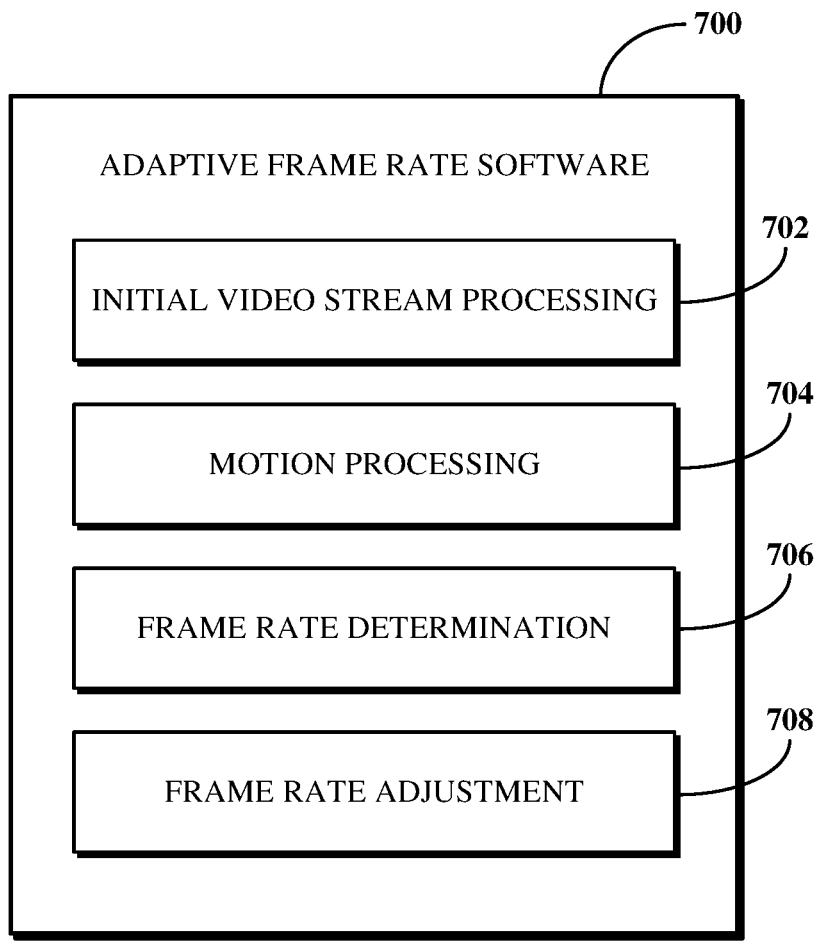
FIG. 7 is a block diagram of an example functionality of adaptive frame rate software.

FIG. 7 is a block diagram of an example functionality of adaptive frame rate software 700. The adaptive frame rate software 700 includes tools, such as programs, subprograms, functions, routines, subroutines, operations, and/or the like for motion-based frame rate adjustment for video streams output for rendering within a software user interface. As shown, the adaptive frame rate software 700 includes an initial video stream processing tool 702, a motion processing tool 704, a frame rate determination tool 706, and a frame rate adjustment tool 708.

In some implementations, the adaptive frame rate software 700 may be run at a client, for example, the physical space device 404 or the client device 410 shown in FIG. 4. In some such implementations, the adaptive frame rate software 700 may include or be included in a client application, for example, the client application 412 or a client application running on the physical space device 404. In some implementations, the adaptive frame rate software 700 may be run at a server, for example, the server device 404 shown in FIG. 4. In some such implementations, the adaptive frame rate software 700 may include or be included in conferencing software, for example, the conferencing software 406 shown in FIG. 4.

The initial video stream processing tool 702 processes an initial video stream obtained from a video capture device located within a physical space, for example, the video capture device 400 shown in FIG. 4. Processing the initial video stream includes determining regions of interest of the initial video stream. The initial video stream processing tool 702 may determine the regions of interest by performing object detection against one or more video frames of the initial video stream. For example, the initial video stream processing tool 702 may use a machine learning model trained for object detection to detect objects (e.g., partial or whole human faces) within the initial video stream. In some cases, the machine learning model may scale down a resolution of the initial video stream (e.g., to 360×240) for the object detection processing or use a scaled down copy of the initial video stream therefor, given that object detection typically does not require high amounts of detail. Each area within the initial video stream at which an object is detected may be determined as a region of interest. The location of each detected region of interest (e.g., expressed in a two-dimensional pixel coordinate format) may be recorded for later use.

Alternatively, the initial video stream processing tool 702 may determine the regions of interest based on metadata obtained from the video capture device which captured the initial video stream. For example, video stream capture software at the video capture device may perform object detection against the initial video stream, such as described above using an object detection model or otherwise, and generate the metadata based on results of the object detection. The metadata may specify locations of objects of potential relevance (e.g., expressed in a two-dimensional pixel coordinate format) within the initial video stream. For example, the initial video stream processing tool 702 may determine the regions of interest based on the metadata by processing the metadata against the initial video stream so as to verify that the objects correspond to conference participants. Alternatively, the metadata may specifically indicate regions of interest and locations thereof within the initial video stream. For example, the initial video stream processing tool 702 may determine the regions of interest based on the metadata by indicating the regions of interest specified by the metadata without verification.

The motion processing tool 704 processes the video content of each of the regions of interest of the initial video stream to determine motion information for those regions of interest. The motion information represents an amount of spatial and/or temporal motion detected within the region of interest, in which spatial motion refers to the actual movement of an object within the region of interest (e.g., a movement of a conference participant or a portion of him or her, such as his or her arm waving) and temporal motion refers to the amount of time and thus the number of video frames which correspond to that spatial motion. Determining the motion information for a given region of interest includes determining spatial and/or temporal motion within video content of the region of interest over some number of video frames of the initial video stream.

Spatial motion for a region of interest may be determined based on a number of pixels that change within a region of interest between consecutive frames. Because some minor motion may be typical for conference participants (e.g., finger tapping or movements from changes in facial expression), spatial motion may be expressed with respect to a pixel threshold. The pixel threshold may, for example, represent a number of pixels within the video content of a region of interest that, if met or exceeded, indicates a spatial motion sufficient to merit an increase in a frame rate for the region of interest. In some implementations, a secondary pixel threshold representing a lower motion value may be used to determine when video content of a region of interest may be appropriately rendered using a decreased frame rate, such as based on the spatial motion thereof meeting or being below that secondary pixel threshold.

Temporal motion for a region of interest may be determined based on the amount of time, and thus a number of consecutive video frames, over which some motion within the region of interest is determined. As mentioned above, because some minor motion may be typical for conference participants, temporal motion may be expressed with respect to a temporal threshold. The temporal threshold may, for example, represent a number of consecutive video frames or seconds over which spatial motion is detected within the video content of a region of interest that, if met or exceeded, indicates a temporal motion sufficient to merit an increase in a frame rate for the region of interest. In some implementations, a secondary temporal threshold representing a lower temporal value may be used to determine when video content of a region of interest may be appropriately rendered using a decreased frame rate, such as based on multiple sets of consecutive video frames over some period of time during a conference being at or below the temporal threshold.

In some implementations, the pixel threshold and/or the temporal threshold may be a constant value which does not change during a conference. In some implementations, the pixel threshold and/or the temporal threshold may change during a conference based on amounts of motion from one or more of the regions of interest. For example, if most or all of the regions of interest have motion information which meet or exceed the pixel threshold and/or the temporal threshold such that most or all of the regions of interest would be considered appropriate for higher frame rate processing, the pixel threshold and/or the temporal threshold may be increased to limit the number of regions of interest which meet or exceed it. In some implementations, the pixel threshold and/or the temporal threshold may be a default or defined value used for all conference participants. In some implementations, the pixel threshold and/or the temporal threshold may be defined on a participant basis. For example, the pixel threshold and/or the temporal threshold may be defined for each conference participant based on the frequency of movement of those conference participants. In some such implementations, historical information regarding participant movement, as will be discussed below, may be used to define the pixel threshold and/or the temporal threshold.

The frame rate determination tool 706 determines frame rates for each of the regions of interest based on the motion information determined for the regions of interest by the motion processing tool 704. The frame rate determination tool 706 in particular may determine the frame rate for a given region of interest based on the comparison between video data associated with the region of interest and at least one of the pixel threshold or the temporal threshold used to determine the motion information. In particular, the frame rate determination tool 706 may determine to increase the frame rate for the region of interest where both of the pixel threshold and the temporal threshold are met. Alternatively, the frame rate determination tool 706 may determine to increase the frame rate for the region of interest where only one of the pixel threshold and the temporal threshold are met. Similarly, the frame rate determination tool may determine to decrease the frame rate for the region of interest where neither of the pixel threshold or the temporal threshold is met or where a secondary threshold for a lower bound of either of spatial motion or temporal motion is met.

Determining the frame rate for a given region of interest thus includes determining the amount by which to increase or decrease the initial frame rate based on the motion information determined for the region of interest. The amount by which to increase or decrease the initial frame rate for a given region of interest may be based on a default value. For example, increases or decreases in frame rates may be made on an incremental basis of N (e.g., 5 or 10) frames per second in which the increase or decrease at such increments is according to that default value regardless of the extent of the motion information.

Alternatively, the amount by which to increase or decrease the initial frame rate for a given region of interest may be based on a value corresponding to the motion information. For example, there may be multiple ranges defined for the motion information, such as based on comparisons of the motion information to the pixel threshold and/or the temporal threshold. In one such example, a first range may represent motion information that exceeds the pixel threshold and the temporal threshold by double the amounts of those thresholds or more, a second range may represent motion information that exceeds the pixel threshold and the temporal threshold by an amount which is between the amounts of those thresholds and double those amounts, a third range may represent motion information that is below the pixel threshold and/or the temporal threshold by an amount that is between the amounts of those thresholds and double those amounts, and a fourth range may represent motion information that is more than twice below the pixel threshold and/or the temporal threshold. A frame rate may accordingly be increased by a first, largest amount when the motion information for the region of interest is in the first range or by a second, smaller amount when the motion information is in the second range. Similarly, the frame rate may accordingly be decreased by a first, smaller amount when the motion information for the region of interest is in the third range or by a fourth, larger amount when the motion information is in the fourth range.

Because a region of interest is associated with a conference participant, the motion information determined for a region of interest is information associated with the subject conference participant. In some implementations, the frame rate determination tool 706 may determine the frame rate for one or more regions of interest based on other information associated with subject conference participants, either in addition to or in place of the motion information. For example, a frame rate for a given region of interest may be determined partially or exclusively based on conversational context, participant priority, and/or historic participant information. Each of these, along with motion information and other information not explicitly described by example herein, may be referred to as a factor.

Determining a frame rate for a region of interest based on conversational context, such as in addition to or instead of other factors, includes determining whether, and optionally by how much, to increase or decrease an initial frame rate for the region of interest based on whether the conference participant associated with the region of interest is an active participant in a current conversation of the conference or is an express or implied subject of such a current conversation. An active participant may be determined based on processing video and/or audio captured using one or more video capture devices and/or one or more audio capture devices within the physical space. For example, direction of audio detected within the physical space can be compared against video including participants appearing to be engaged in discussion to determine whether someone is an active participant. An express or implied subject of a current conversation may be determined based on a real-time transcription of the conference. In particular, a real-time transcription of the conference may be processed using natural language processing to determine names and/or topics being referenced during a current portion of a conversation of the conference. The names may be compared against known names of the conference participants. As such, a participant may be expressly identified as the subject of a conversation where his or her name is identified within the real-time transcription of the conference. Separately, the topics may be compared against a knowledgebase corresponding certain conference participants to certain subject matter, such as based on an organizational chart, project identifications, skill sets, or the like. As such, a participant may be impliedly identified as the subject of a conversation where a topic with which he or she is associated is identified within the real-time transcription of the conference. Frame rates for active participants may be increased by larger amounts than frame rates for participants who are the subject of a current conversation. Similarly, frame rates for other participants, that is, participants who are not involved in a current conversation, may be decreased or otherwise left as-is.

Determining a frame rate for a region of interest based on participant priority, such as in addition to or instead of other factors, includes determining priority information for some or all of the conference participants and determining frames rates for them based on that priority information. Priority information may indicate an importance of a subject participant to the conference. For example, a conference participant who is designated as a key speaker at the conference, either based on him or her having hosting privileges, actively sharing media, being a main speaker for more than a threshold period of time (e.g., 1 or 5 minutes), or is identified based on conversational context within a real-time transcription of the conference as being a speaker (e.g., based on someone else introducing them as a speaker for the conference) may have high priority information. In another example, a conference participant who is simply an audience member may have low priority information. Alternatively, priority information may indicate an importance of a subject participant to an entity involved in a conference, for example: in conferences within a company, stakeholders, executives, officers, or other superiors; teachers, professors, principals, or deans in a school; or hosts in personal conference settings. Increased frame rates may be determined for conference participants with high priority information. Similarly, decreased frame rates may be determined for conference participants with low priority information.

Determining a frame rate for a region of interest based on historic participant information, such as in addition to or instead of other factors, includes accessing a data store storing records of past conference data to determine which, if any, of the conference participants to the current conference are identified as frequent speakers and/or frequent movers. For example, information associated with one or more conference participants of a given past conference may be recorded after the conference ends within one or more records of a data store to indicate participant information for use with future conferences. The information may indicate one or more of a number of times the participant spoke, a total length of time the participant spoke, a percentage of the total conference time during which the participant spoke, a number of times the participant has spatial motion meet or exceed a pixel threshold, a number of times the participant has temporal motion meet or exceed a temporal threshold, or a degree to which the participant exceeded a pixel and/or temporal threshold on one or more occasions. Increased frame rates may be determined for conference participants with historic participant information indicating frequent speech or movement. Similarly, decreased frame rates may be determined for conference participants with low speech or movement.

In some implementations, a machine learning model can be used to determine which conference participants should have increased frame rates or decreased frame rates based on the initial video stream for the subject conference. For example, the machine learning model can be trained to recognize occurrences based on one or more of the factors described above.

In some implementations, a software user interface at which the video streams for the regions of interest will be rendered may include user interface controls available to one or more participants for manually requesting or specifying frame rates to use for one or more of the regions of interest. In some such implementations, motion information for a region of interest indicated via such a control may be evaluated to determine whether the current frame rate thereof should change before applying the requested change.

The frame rate adjustment tool 708 adjusts or otherwise causes the adjustment of frame rates of regions of interest according to the frame rates determined by the frame rate determination tool 706. The frame rate adjustment tool 708 may generate instructions and transmit, or cause a transmission of, those instructions to the video capture device from which the initial video stream was obtained to cause that video capture device to capture the individual video streams for each of the regions of interest at the specified frame rates. For example, the instructions may configure the video capture device to open multiple video capture pipelines and, using the same sensor or different sensors, use each of those pipelines to capture a video stream for a different region of interest at the frame rate determined therefor. The instructions, while referred to as instructions, may be or otherwise include one or more of instructions, commands, data, and/or other information which can be processed to cause the video capture device which receives the instructions to capture the video streams at the determined frame rates. The instructions in such a case are generated based on the regions of interest determined by the initial video stream processing tool 702 and the frame rates determined by the frame rate determination tool 706. Video streams representing the respective video content at the adjusted frame rates may then be output, such as for rendering within separate user interface tiles of a conferencing software user interface.

Alternatively, the frame rate adjustment tool 708 may generate instructions and transmit, or cause a transmission of, those instructions to the video capture device form which the initial video stream was obtained to cause that video capture device to capture the individual video streams for each of the regions of interest at the same frame rate as was used for the initial video stream. For example, the instructions may configure the video capture device to open multiple video capture pipelines and, using the same sensor or different sensors, use each of those pipelines to capture a video stream for a different region of interest at the initial frame rate. The frame rate adjustment tool 708, upon receipt of those video streams, may then adjust the frame rates for individual ones of the video streams based on the frame rates determined by the frame rate determination tool 706. The instructions, while referred to as instructions, may be or otherwise include one or more of instructions, commands, data, and/or other information which can be processed to cause the video capture device which receives the instructions to capture the video streams at the initial frame rate. The instructions in such a case are generated based on the initial frame rate and regions of interest determined by the initial video stream processing tool 702. Video streams representing the respective video content at the adjusted frame rates may then be output, such as for rendering within separate user interface tiles of a conferencing software user interface.

As a further alternative, the frame rate adjustment tool 708 may process the video content of the regions of interest according to the separate frame rates determined for those regions of interest by the frame rate determination tool 706. For example, the frame rate adjustment tool 708 may separate the video content of the respective regions of interest from the initial video stream (either on its own or using other software) and adjust the frame rates for such video content. Video streams representing the respective video content at the adjusted frame rates may then be output, such as for rendering within separate user interface tiles of a conferencing software user interface.

The processing by the motion information determination tool 704, the frame rate determination tool 706, and/or the frame rate adjustment tool 708 may be performed on a periodic or non-periodic basis. For example, when performed on a periodic basis, the processing to determine motion information for regions of interest may be performed every M (e.g., 15 or 30) seconds or on some other basis (e.g., once per minute). Where there is no change to the motion information for a given time interval, the frame rate determination tool 706 may omit performing frame rate determination for that time interval. However, where there is a change in the motion information for that time interval, the frame rate determination tool 706 may proceed to perform frame frate determination for that time interval, and the frame rate adjustment tool 708 may accordingly adjust the frame rate of the subject regions of interest (e.g., by adjusting the frame rate of a video stream already being captured specifically for a given region of interest or instructing the video capture device to reinitiate capture of that video stream at the new frame rate). In another example, when performed on a non-periodic basis, the processing to determine motion information for regions of interest may be in response to an event detected within the video streams already being captured for subject ones of those regions of interest. The processing to determine new frame rates based on that motion information and the resulting adjustment of frame rates based on those new frame rates accordingly follow the new motion information.

In some implementations, where the processing is performed on a periodic basis, the increasing of a frame rate for a given region of interest may be based on a successful network metric evaluation. For example, the evaluation may consider whether there has been packet loss over a preceding period of time (e.g., during the preceding time interval). In the event no packet loss has occurred, the frame rate for one or more regions of interest may be increased as determined herein. However, if such packet loss has occurred, frame rate adjustment may be paused or skipped for the subject time interval. In some such implementations, the frame rate for a given region of interest may be increased incrementally to a frame rate determined for use with the region of interest upon consecutive successful network metric evaluations. For example, the initial frame rate for a video stream may be 25 frames per second. Upon a first determination of no packet loss for a first time interval, the frame rate may be increased to 30 frames per second. Upon a second determination of no packet loss for a second time interval, the frame rate may be increased to 35 frames per second. This may continue until a general frame rate cap (e.g., 60 frames per second) or a specific, lower frame rate cap determined for the video is reached.

Although the tools 702 through 708 are shown as functionality of the adaptive frame rate software 700 as a single piece of software, in some implementations, some or all of the tools 702 through 708 may exist outside of the adaptive frame rate software 700 and/or the software platform may exclude the adaptive frame rate software 700 while still including the some or all of tools 702 through 708 in some form elsewhere. For example, some or all of the tools 702 through 708 may be implemented by conferencing software, such as the conferencing software 406 shown in FIG. 4.

Although the tools 702 through 708 as described above are generally related to a conferencing context in which multiple conference participants are within a single physical space (e.g., conference room) and frame rates are determined for regions of interest within an initial video stream of that physical space, in some implementations, the adaptive frame rate software 700 may instead process initial video streams received from each of multiple participant devices (e.g., client devices or non-client devices) connected to conferencing software from the same local area network, whether or not from the same physical space. For example, in some cases, there may be multiple participant devices connecting to a conference from the same place and thus using the same network. Given that there may be network constraints regarding the total bandwidth available to all devices connected to that local area network, frame rates for the participant devices to use may be determined based not only on information particular to the video streams obtained from those participant devices but also network constraints associated with the local area network.

Accordingly, in some implementations, the adaptive frame rate software 700 may run on a server device which runs conferencing software implementing a conference to which participant devices are connected. The initial video stream processing tool 702 may obtain video streams from each of the participant devices connected to the conference over a same local area network. The motion information determination tool 704 may process those video streams to determine motion information for the respective participant devices. The frame rate determination tool 706 may use that motion information and/or other information particular to the respective video streams to determine frame rates for the respective participant devise to use based on network constraints associated with the local area network. The frame rate adjustment tool 708 may then instruct the connected participant devices, during the conference, those participant devices to capture video streams at the frame rates determined therefor. Instructing a participant device to capture a video stream at a determined frame rate can include transmitting instructions configured to cause a client application or other software running at the participant device and used by the participant device to connect to the conference (e.g., a web browser) to adjust the frame rate at which it is capturing the video stream. Alternatively, instructing a participant device to capture a video stream at a determined frame rate can include transmitting, for output to a user of the participant device, a prompt enabling the user to select to adjust the frame rate according to the determination made for the video stream.

The network constraint used for determining the frame rates for the participant devices to use to capture the video streams represents a constraint or other limitation of the local area network. For example, the network constraint may refer to a total amount of network bandwidth remaining available for connected devices. In another example, the network constraint may refer to a total amount of network bandwidth currently in use by connected devices. In other examples, the network constraint may refer to limitations on the number of devices which can connect to the local area network, an average amount of bandwidth used by a connected device, or throughput limitations of the network devices which implement the local area network. Commonalities in network information can be evaluated to determine that multiple of the participant devices are connected to the same local area network. For example, the network information obtained from a participant device may indicate an IP address, subnet mask, network SSID, or other network aspect indicative of a local area network or one or more network devices used to implement the local area network (e.g., switches or routers). The participant devices which are on the same local area network may report the same such network information.

Determining the network constraint, which may, for example, be performed by the frame rate determination tool 706 or another tool of the adaptive frame rate software 700, can include causing the client application or other software running at a participant device connected to the conference to report network information for the local area network usable to determine the network constraint. For example, a server running the conferencing software used to implement the conference can, at one or more times during the conference, transmit requests to one or more of the participant devices for the network information. In another example, the client applications running at the participant devices may be configured to report the network information without request from the server.

The amounts by which to increase or decrease a frame rate for a participant device to use to capture a video stream based on the network constraint may be determined by evaluating the network information against a model. The model may, for example, be a machine learning model trained for network processing or another model empirically determined based on sets of network training data. The model may indicate frame rate adjustments mapped to various network information. For example, the model may indicate that a frame rate may be increased by 20 to 30 frames per second where there are less than N (e.g., twenty) devices connected to the local area network and at least a gigabyte per second of network bandwidth. In another example, the model may indicate that a frame rate may be increased by only 5 to 10 frames per second where there are more than N (e.g., twenty) devices connected to the local area network and less than a gigabyte per second of network bandwidth. The specific parameter values used by the model for mapping network information to frame rate adjustments may be defined based on information specific to a software platform customer or default, such as defined independent of such information specific to the software platform customer.

In one example use case for this local area network-based approach, multiple conference participants may connect to a conference from their own offices at a software platform customer premises. For example, those conference participants may be co-workers who do not share a device to access the conference. The participant devices used by those conference participants to connect to the conference may connect thereto via a local area network at the premises. For example, those participant devices can be determined to connect via the same local area network based on each of those participant devices using an IP address from the same subnet mask or a same set of subnet masks. Where there are two such conference participants, for example, a first conference participant may be someone who is frequently moving, frequently talking, or otherwise identified, based on one or more of the factors described above, as a participant for whom an increased frame rate should be used. Where the second conference participant is determined to merely be an audience member who is not speaking or moving much and the network bandwidth of the local area network allows for it, the frame rate for the first conference participant's device to use to capture its video stream can be increased to improve the quality of his or her video rendered during the conference. However, where the one or more factors for both of the first and the second conference participants indicate to increase frame rates for both of them, a total amount of network bandwidth (e.g., obtained by causing one or both of their participant devices to ping the local area network and report the results to the server) may be used to control the amounts by which the frame rates may be increased. For example, if there is limited bandwidth available and the first conference participant has more factors which indicate to increase his or her bandwidth than the second conference participant (e.g., because priority information indicates that the first conference participant has a higher priority than the second conference participant), the frame rate for the first conference participant's device to use may be increased by more than the amount by which the frame rate for the second conference participant's to use is increased, or the frame rate for the second conference participant's device to use may not be increased at all. Other example use cases may apply the same processing to education settings (e.g., in which the participant devices are used by students or teachers in the same school), debates (e.g., in which the participant devices are used by debate participants and/or moderators), concerts (e.g., in which the participant devices are used by artists, band members, dancers, or emcees), or e-sports (e.g., in which the participant devices are used by e-sports players, referees, or reporters).

Figure 8:
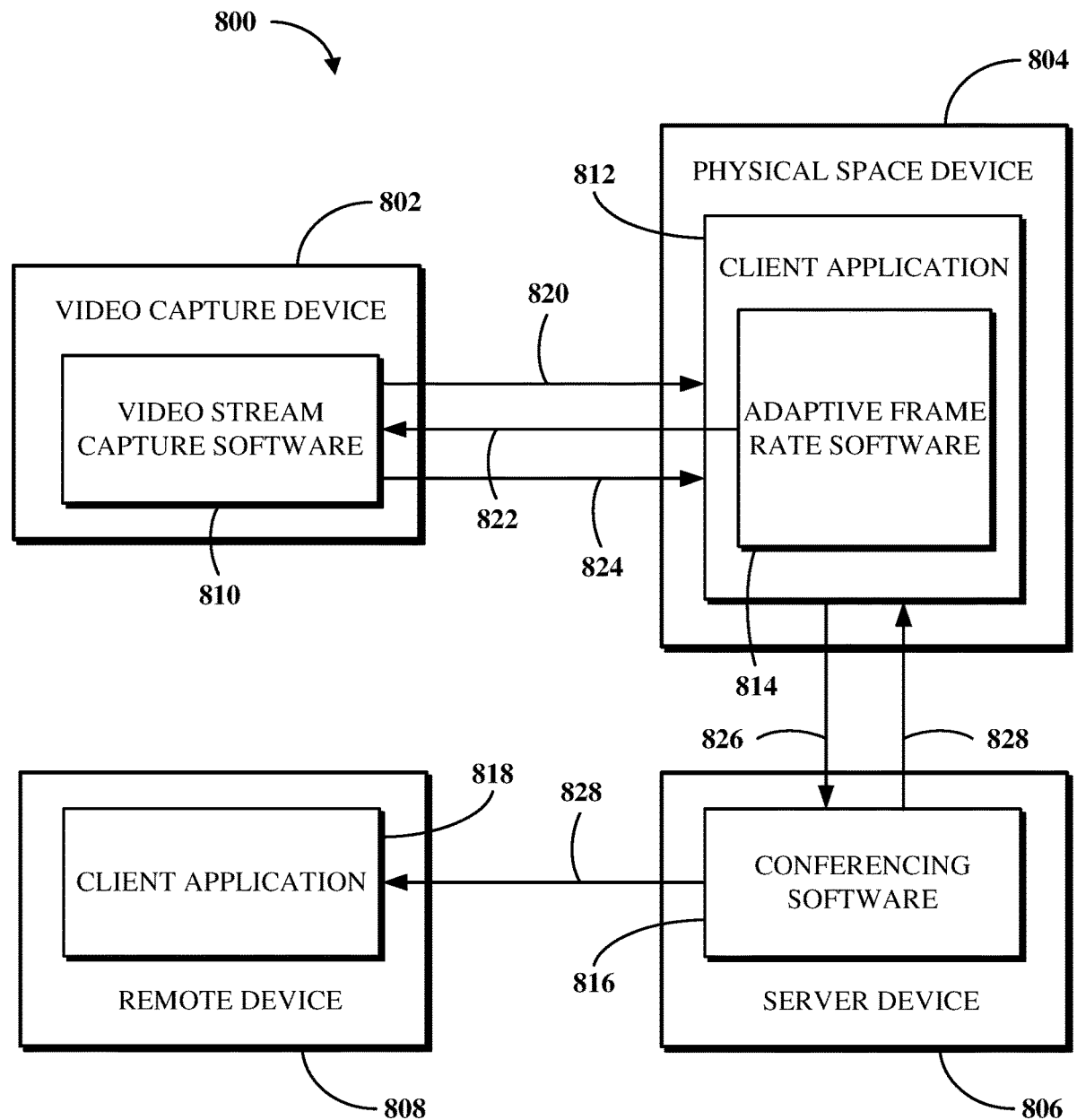
FIG. 8 is a block diagram of an example of a system for motion-based frame rate adjustment for in-person conference participants.

FIG. 8 is a block diagram of an example of a system 800 for motion-based frame rate adjustment for in-person conference participants. The system 800 includes a video capture device 802, a physical space device 804, a server device 806, and a remote device 808, which may, for example, respectively be the video capture device 400, the physical space device 404, the server device 408, and the client device 410 shown in FIG. 4. The video capture device 802 runs video stream capture software 810 used to capture video streams using one or more video capture pipelines of the video capture device 802. The physical space device 804 runs a client application 812 which includes adaptive frame rate software 814, which may, for example, be the adaptive frame rate software 700 shown in FIG. 7. The server device 806 runs conferencing software 816, which may, for example, be the conferencing software 406 shown in FIG. 4. The remote device 808 runs a client application 818, which may, for example, be the client application 412 shown in FIG. 4. The client application 812 and the client application 818 may represent separate instances and/or versions of the same client software, for example, client software for accessing one or more services of a software platform, such as the software platform 300 shown in FIG. 3.

The video stream capture software 810 is used to capture an initial video stream 820 (optionally accompanied by metadata), which is transmitted to the client application 812. The adaptive frame rate software 814 determines frame rates for regions of interest of the initial video stream 820 and transmits instructions 822 for capturing video streams for those regions of interest at those frame rates. The video stream capture software 810 captures those video streams 824 according to the instructions 822 and transmits the video streams 824 to the client application 812. The client application 812 processes the video streams to prepare them for transmission to the conferencing software 816 and thereafter transmits the processed video streams 826 to the conferencing software 816. The conferencing software 816 further processes the processed video streams 826 to prepare them as output for rendering within separate user interface tiles of a user interface of the conferencing software 816. The conferencing software 816 the outputs the video streams 828 for rendering to the client application 812 and to the client application 818.

In some implementations, the instructions 822 may be omitted. For example, the adaptive frame rate software 814 may determine frame rates for regions of interest of the initial video stream 820 and thereafter update the frame rates for each of the regions of interest using the video content of the initial video stream 820. The video streams 824 representing the video content of the individual regions of interest at the adjusted frame rates may then be output by the adaptive frame rate software 814 and processed and transmitted as described above.

Figure 9:
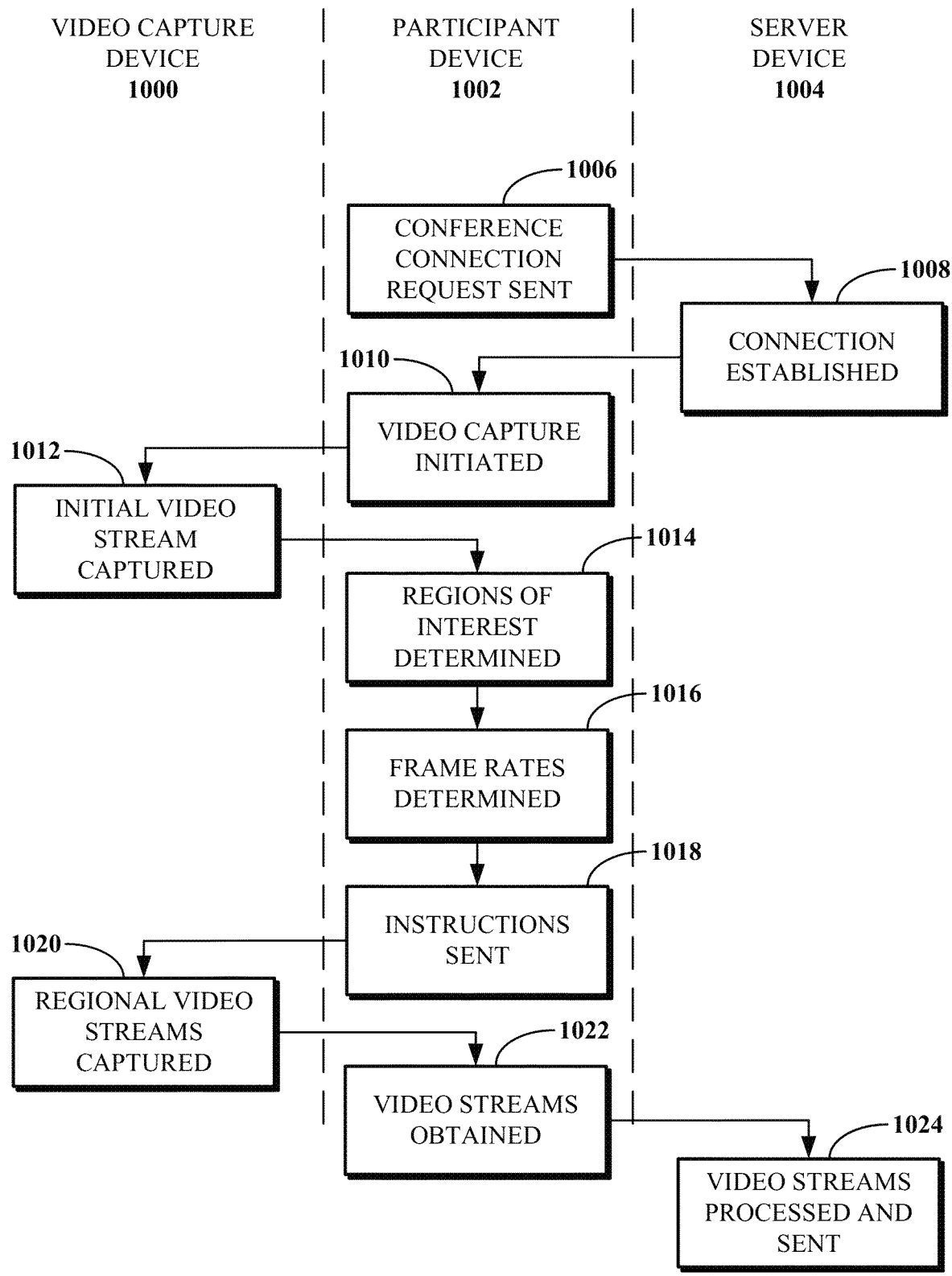
FIG. 9 is an illustration of swim lanes showing an example sequence of operations performed for motion-based frame rate adjustment for in-person conference participants.

FIG. 9 is an illustration of swim lanes showing an example sequence of operations performed for motion-based frame rate adjustment for in-person conference participants. In particular, the sequence of operations is between a video capture device 900, a physical space device, 902, and a server device 904. The video capture device 900 may, for example, be the video capture device 802 shown in FIG. 8. The physical space device 902 may, for example, be the physical space device 804 shown in FIG. 8. The server device 904 may, for example, be the server device 806 shown in FIG. 8. As such, the sequence of operations shown in FIG. 9 may represent operations performed by or otherwise in connection with a system for motion-based frame rate adjustment for in-person conference participants, for example, the system 800 shown in FIG. 8.

At 906, a conference connection request is sent from the physical space device 902 to the server device 904, in particular, from a client application running at the physical space device 902 to conferencing software running at the server device 904. For example, the conference connection request may be sent in response to a user of the physical space device 902 starting a conference or clicking a link to join a conference from the physical space device 902. At 908, the connection is established between the physical space device 902 and the server device 904 based on the conference connection request. At 910, video capture is initiated at the physical space device 902. At 912, responsive to the initiation of the video capture, an initial video stream is captured by the video capture device 9000. At 914, regions of interest of the initial video stream are determined at the physical space device 902. At 916, frame rates are determined for the regions of interest, for example, using adaptive frame rate determination software at the physical space device 902. At 918, instructions for capturing video streams, at the determined frame rates, are transmitted to the video capture device 900. At 920, the video streams for the regions of interest are captured by the video capture device 900 at the determined frame rates according to the instructions transmitted from the physical space device 902. At 922, the video streams captured according to the instructions are obtained by the physical space device 902. At 924, those video streams are transmitted to the server device 904, where they are processed and sent out for rendering at connected devices.

In some implementations, the operations described with respect to 918 through 922 may be omitted. For example, rather than the physical space device 902 transmitting the instructions to capture the video streams at the determined frame rates to the video capture device 900, the physical space device 902 may adjust the frame rates for video content within the initial video stream captured by the video capture device 900 at 912. In such a case, the video streams at the adjusted frame rates may be transmitted to the server device 904 at 924 for processing and output to the connected devices.

Figure 10:
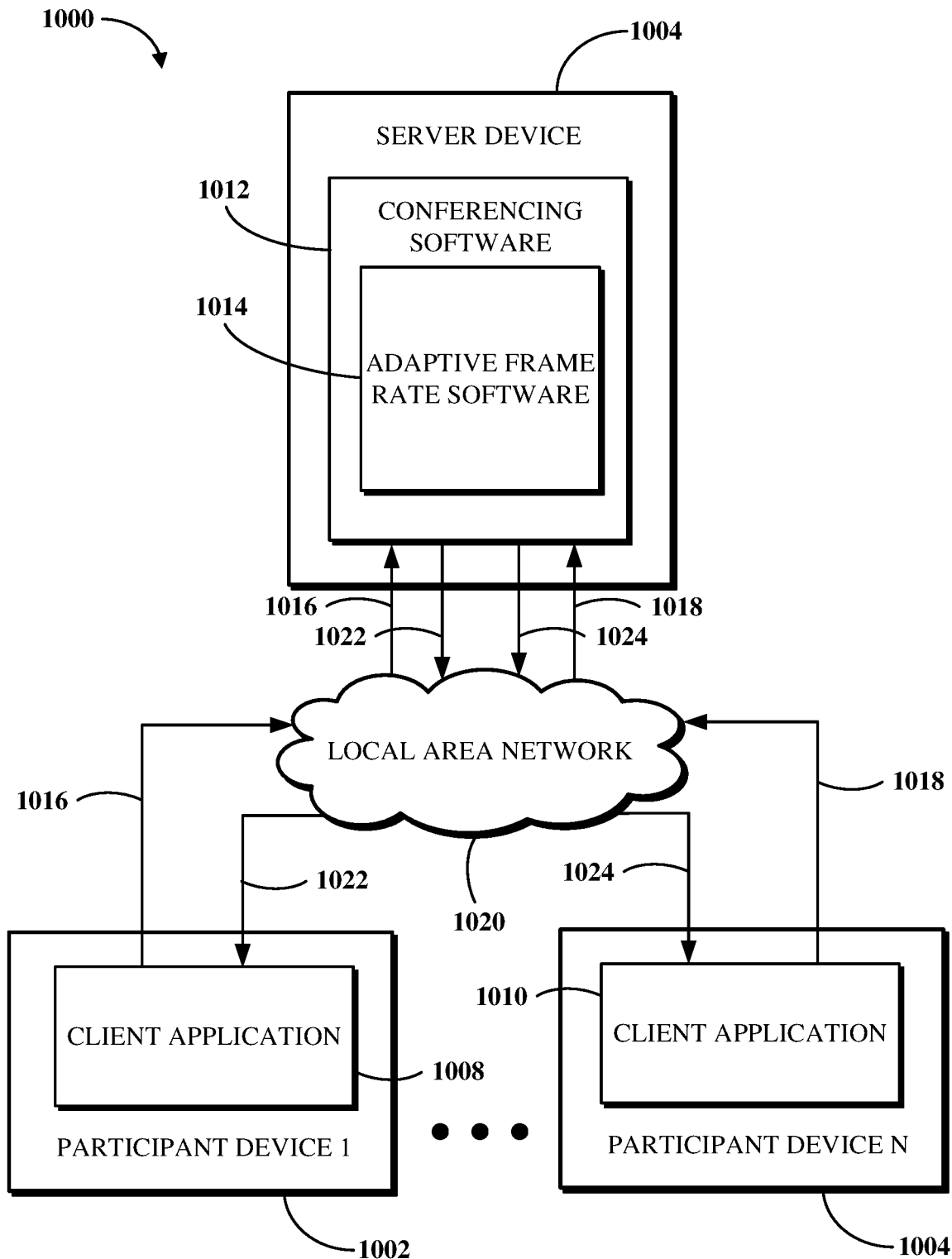
FIG. 10 is a block diagram of an example of a system for motion-based frame rate adjustment for network-connected conference participants.

FIG. 10 is a block diagram of an example of a system 1000 for motion-based frame rate adjustment for network-connected conference participants. The system 1000 includes participant devices including a participant device 1 1002 through a participant device N 1004 (in which N is an integer greater than or equal to 2) and a server device 1006. The participant devices 1 1002 through N 1004 are client devices or non-client devices which may be used in a conferencing system, for example, the client device 410 shown in FIG. 4. The server device is a server device used to implement a conference, for example, the server device 408 shown in FIG. 4. The participant device 1 1002 runs a client application 1008 and the participant device N 1004 runs a client application 1010. The client application 1008 and the client application 1010 are client applications which may connect the participant devices 1 1002 through N 1004 to conferencing software 1012 running at the server device 1004, for example, the client application 412 shown in FIG. 4. The client application 1008 and the client application 1010 may represent separate instances and/or versions of the same client software, for example, client software for accessing one or more services of a software platform, such as the software platform 300 shown in FIG. 3. The conferencing software 1012 may, for example, be the conferencing software 406 shown in FIG. 4. The conferencing software 1012 includes adaptive frame rate software 1014, which may, for example, be the adaptive frame rate software 700 shown in FIG. 7.

Video capture devices at the participant devices 1 1002 through N 1004 capture video streams 1016 and 1018, respectively, and transmit those video streams 1016 and 1018 to the conferencing software 1012 via a local area network 1020 to which the participant devices 1 1002 through N 1004 are connected. The adaptive frame rate software 1014 accesses the video streams 1016 and 1018 obtained by the conferencing software 1012 and processes them to determine a first frame rate for the video stream 1016 and a second frame rate for the video stream 1018. The first frame rate represents an adjusted frame rate for the video stream 1016 captured by the participant device 1 1002 and thus may be determined by increasing or decreasing the frame rate for the video stream 1016. Similarly, the second frame rate represents an adjusted frame rate for the video stream 1018 captured by the participant device N 1004 and thus may be determined by increasing or decreasing the frame rate for the video stream 1018. The conferencing software 1012, or in some cases the adaptive frame rate software 1014, then transmits data 1022 indicative of the first frame rate to the participant device 1 1002 and data 1024 indicative of the second frame rate to the participant device N 1004. The participant device 1 1002 processes the data 1022 to adjust the frame rate at which the video stream 1016 is being captured, and the participant device N 1004 similarly processes the data 1024 to adjust the frame rate at which the video stream 1018 is being captured. Upon processing of the data 1022 at the participant device 1 1002, the participant device 1 1002 begins capturing video data at the first frame rate. Upon processing of the data 1024 at the participant device N 1004, the participant device N 1004 begins capturing video data at the second frame rate.

In some cases, the transmission and/or processing of the video stream 1016 and the video stream 1018 may be simultaneous or near simultaneous (e.g., within a short time period of each other). In some such cases, the transmission and/or processing of the data 1022 and the data 1024 may be simultaneous or near simultaneous (e.g., within a short time period of each other). In other such cases, the transmission and/or processing of the data 1022 and the data 1024 may occur at separate times. In some cases, the transmission and/or processing of the video stream 1016 and the video stream 1018 can occur at separate times. In some such cases, the transmission and/or processing of the data 1022 and the data 1024 may be simultaneous or near simultaneous (e.g., within a short time period of each other). In other such cases, the transmission and/or processing of the data 1022 and the data 1024 may occur at separate times.

Figure 11:
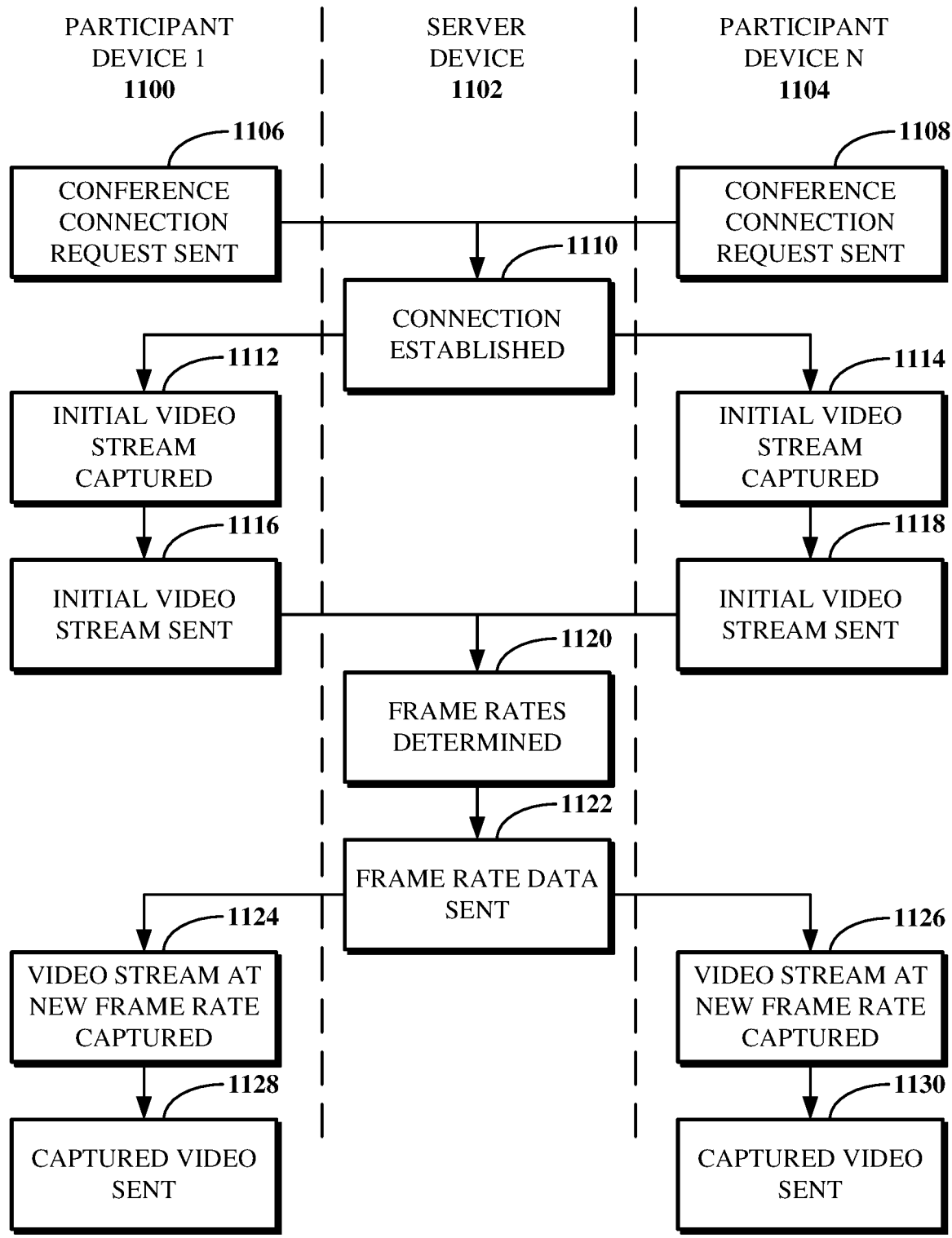
FIG. 11 is an illustration of swim lanes showing an example sequence of operations performed for motion-based frame rate adjustment for network-connected conference participants.

FIG. 11 is an illustration of swim lanes showing an example sequence of operations performed for motion-based frame rate adjustment for network-connected conference participants. In particular, the sequence of operations is between a participant device 1 1100, a server device 1102, and a participant device N 1104. The participant device 1 1100 may, for example, be the participant device 1 1002 shown in FIG. 10. The server device 1102 may, for example, be the server device 1006 shown in FIG. 10. The participant device N 1104 may, for example, be the participant device N 1004 shown in FIG. 10. As such, the sequence of operations shown in FIG. 11 may represent operations performed by or otherwise in connection with a system for motion-based frame rate adjustment for network-connected conference participants, for example, the system 1000 shown in FIG. 10.

At 1106, a conference connection request is sent from the participant device 1 1100 to the server device 1102, in particular, from a client application running at the participant device 1 1100 to conferencing software running at the server device 1102. For example, the conference connection request may be sent in response to a user of the participant device 1 1100 starting a conference or clicking a link to join a conference from the participant device 1 1100. At 1108, a conference connection request is similarly sent from the participant device N 1104 to the server device 1102. At 1110, the connection is established between the server device 904 and each of the participant device 1 1100 and the participant device N 1104 based on the conference connection requests. At 910, video capture is initiated at the physical space device 902. At 1112, an initial video stream is captured at the participant device 1 1100. At 1114, an initial video stream is captured at the participant device N 1104. At 1116, the initial video stream captured at the participant device 1 1100 is sent to the server device 1102. At 1118, the initial video stream captured at the participant device N 1104 is sent to the server device 1102.

At 1120, frame rates are determined for the initial video streams received from the participant device 1 1100 and the participant device N 1104. For example, a first frame rate can be determined for the participant device 1 1100 based on the initial video stream sent therefrom and a second frame rate can be determined for the participant device N 1104 based on the initial video stream sent therefrom. At 1122, data indicative of the frame rates determined for the initial video streams are sent to the participant device 1 1100 and the participant device N 1104. At 1124, the data sent from the server device 1102 is processed at the participant device 1 1100 to cause the participant device 1 1100 (e.g., a video capture device thereof) to begin capturing a video stream at the frame rate determined at the server 1102. At 1126, the data sent from the server device 1102 is processed at the participant device N 1104 to cause the participant device N 1104 (e.g., a video capture device thereof) to begin capturing a video stream at the frame rate determined at the server 1102. At 1128, the video stream captured at the participant device 1 1100 according to the frame rate determined at the server device 1102 is sent to the server 1102 for processing and sending out for rendering at connected devices. At 1130, the video stream captured at the participant device N 1104 according to the frame rate determined at the server device 1102 is sent to the server 1102 for processing and sending out for rendering at connected devices.

Although the sequence of operations shown in FIG. 11 depicts certain operations being performed simultaneously or near simultaneously for the participant device 1 1100 and the participant device N 1104, in some implementations, such operations may occur in other orders and/or times which may be near or separate from one another. For example, The conference connection request sent at 1108 may be sent several minutes after the conference connection request sent 1106 is sent. In another example, the frame rate determination performed at 1120 for the initial video stream sent at 1116 may occur before the frame rate determination performed at 1122 for the initial video stream sent at 1118.

Figure 12:
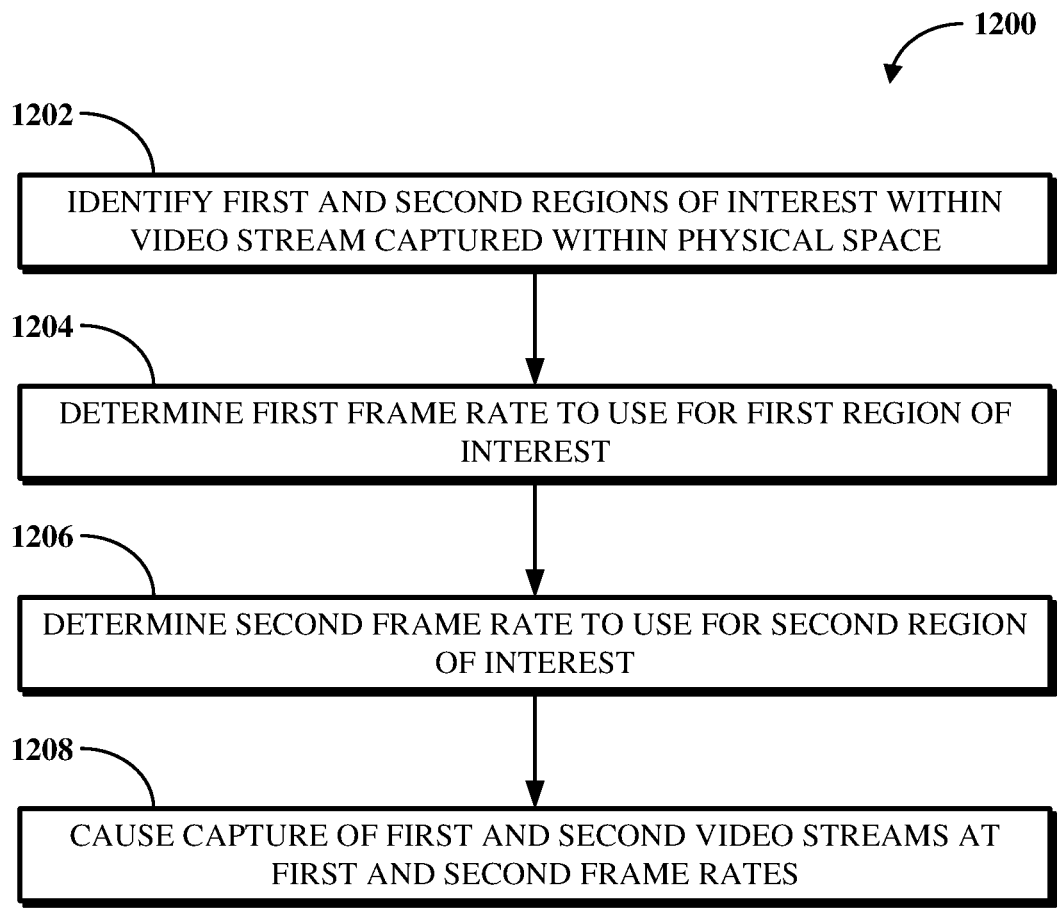
FIG. 12 is a flowchart of an example of a technique for motion-based frame rate adjustment for in-person conference participants.
Figure 13:
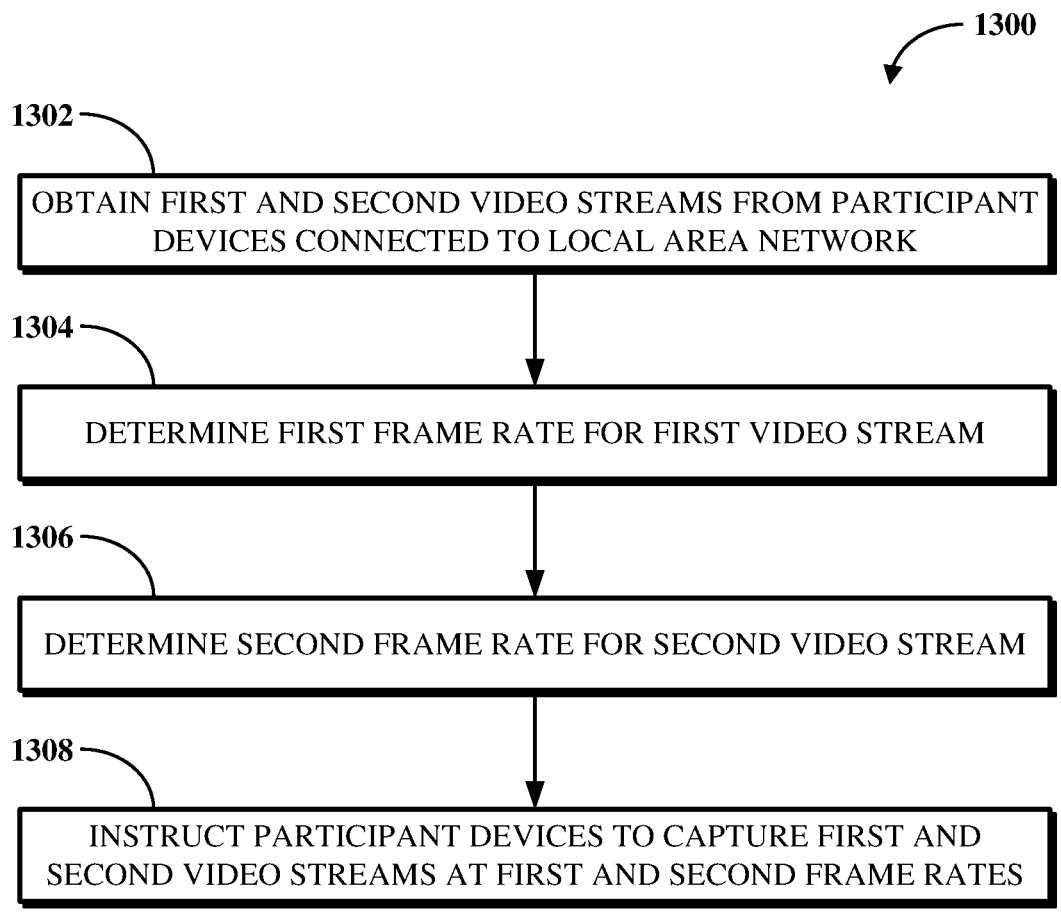
FIG. 13 is a flowchart of an example of a technique for motion-based frame rate adjustment for network-connected conference participants.

To further describe some implementations in greater detail, reference is next made to examples of techniques which may be performed by or using a system for motion-based frame rate adjustment for video streams output for rendering within a software user interface. FIG. 12 is a flowchart of an example of a technique 1200 for motion-based frame rate adjustment for in-person conference participants. FIG. 13 is a flowchart of another example of a technique 1300 for motion-based frame rate adjustment for network-connected conference participants.

The technique 1200 and/or the technique 1300 can be executed using computing devices, such as the systems, hardware, and software described with respect to FIGS. 1-11. The technique 1200 and/or the technique 1300 can be performed, for example, by executing a machine-readable program or other computer-executable instructions, such as routines, instructions, programs, or other code. The steps, or operations, of the technique 1200 and/or the technique 1300 or another technique, method, process, or algorithm described in connection with the implementations disclosed herein can be implemented directly in hardware, firmware, software executed by hardware, circuitry, or a combination thereof.

For simplicity of explanation, the technique 1200 and the technique 1300 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 12, the technique 1200 for motion-based frame rate adjustment for in-person conference participants is shown. At 1202, first and second regions of interest are identified within an initial video stream captured by a video capture device located within a physical space during a conference. The first region of interest is associated with a first conference participant within the physical space and the second region of interest is associated with a second conference participant within the physical space. Identifying the first and second regions of interest may include obtaining data indicative of the first region of interest and of the second region of interest from the video capture device. Alternatively, identifying the first and second regions of interest may include receiving the initial video stream from the video capture device, and processing the initial video stream to detect the first region of interest and the second region of interest.

At 1204, a first frame rate to use for the first region of interest is determined based on information associated with the first conference participant. At 1206, a second frame rate to use for the second region of interest is determined based on information associated with the second conference participant. The first and second frame rates are determined to represent increases or decreases over an initial frame rate used for the capture of the initial video stream. As such, in at least some cases, at least one of the first frame rate or the second frame rate may be higher than a default frame rate used for capturing the initial video stream.

The information associated with the first conference participant or with the second conference participant may correspond to one or more of motion information, conversational context information, participant priority information, or historic participant information. For example, in some cases, the information associated with the first conference participant corresponds to motion information determined for the first region of interest and the information associated with the second conference participant corresponds to motion information determined for the second region of interest. In such a case, the information particular to the first conference participant corresponds to a comparison between video data associated with the first region of interest and at least one of a pixel threshold or a temporal threshold, and the information particular to the second conference participant corresponds to a comparison between video data associated with the second region of interest and one or both of the pixel threshold or the temporal threshold. As such, the first frame rate may be higher than second frame rate where an amount of motion detected with respect to the first region of interest is higher than an amount of motion detected with respect to the second region of interest. In another example, in some cases, the information particular to the first conference participant corresponds to historical profile data associated with the first conference participant, and the information particular to the second conference participant corresponds to historical profile data associated with the second conference participant. In yet another example, the information associated with the first conference participant indicates a priority status of the first conference participant and the information associated with the second conference participant indicates a priority status of the second conference participant. In still a further example, the information associated with the first conference participant and the information associated with the second conference participant correspond to a conversational context determined within the physical space.

At 1208, the capture of first and second video streams at the first and second frame rates, respectively, is caused. In some cases, causing the capture of the first and second video streams includes causing the video capture device to use first and second video capture pipelines to capture the first and second video streams at the first and second frame rates, respectively. For example, causing the capture of the first and second video streams can include instructing the video capture device to capture the first video stream and the first frame rate and the second video stream at the second frame rate. Alternatively, in some cases, causing the capture of the first and second video streams includes causing the video capture device to use first and second video capture pipelines to capture the first and second video streams at an initial frame rate. For example, causing the capture of the first and second video streams can include instructing the video capture device to capture the first video stream and the second video stream at an initial frame rate, in which the frame rate of the first video stream is adjusted from the initial frame rate to the first frame rate and the frame rate of the second video stream is adjusted from the initial frame rate to the second frame rate. The capture of the first video stream at the first frame rate configures the first video stream to be rendered at the first frame rate within a first user interface tile of conferencing software and the capture of the second video stream at the second frame rate configures the second video stream to be rendered at the second frame rate within a second user interface tile of the conferencing software.

In some implementations, rather than causing the capture of the first and second video streams, the technique 1200 can include processing video content of each of the first and second regions of interest to produce a first video stream for the first region of interest at the first frame rate and a second video stream for the second region of interest at the second frame rate. In some implementations, causing the capture of the first and second video streams can include verifying a successful network evaluation for a physical space device associated with the video capture device. For example, the successful network evaluation may refer to a determination that a network condition associated with a network to which the physical space device is connected enables frame rate increases from an initial frame rate for the initial video stream to the first frame rate and the second frame rate. In some implementations, software running at the physical space device can ping a server running conferencing software used to implement the subject conference, and results of that ping process can indicate whether bandwidth is available to increase the frame rates for one or both of the first or second regions of interest. In some implementations, the technique 1200 can include incrementally updating at least one of the first frame rate of the second frame rate on a periodic basis according to network information (e.g., network bandwidth for the network to which the video capture device or a physical space device coupled to the video capture device is connected). In some implementations, the technique 1200 can include updating the first frame rate responsive to an event detected in connection with the first conference participant or the second frame rate responsive to an event detected in connection with the second conference participant.

Referring next to FIG. 13, the technique 1300 for motion-based frame rate adjustment for network-connected conference participants is shown. At 1302, first and second video streams are respectively obtained during a conference from first and second participant devices connected to a local area network. The first and second participant devices may be client devices or non-client devices. The connection of the first and second participant devices individually to the local area network may be over wired or wireless means.

At 1304, a first frame rate is determined for the first participant device to use based on information particular to the first video stream and based on a network constraint associated with the local area network. At 1306, a second frame rate is determined for the second participant device to use based on information particular to the second video stream and based on the network constraint associated with the local area network. The first and second frame rates are determined to represent increases or decreases over a frame rate initially used for the captures of the first and second video streams. As such, in at least some cases, at least one of the first frame rate or the second frame rate may be higher than a default frame rate used for initially capturing the first and second video streams.

The information particular to the first video stream or the second video stream may correspond to one or more of motion information, conversational context information, participant priority information, or historic participant information. For example, the information particular to the first video stream corresponds to motion information determined for the first video stream and the information particular to the second video stream corresponds to motion information determined for the second video stream. In some such cases, the information particular to the first video stream corresponds to a comparison between video data of the first video stream and one or both of a pixel threshold or a temporal threshold, and the information particular to the second video stream corresponds to a comparison between video data of the second video stream and one or both of the pixel threshold or the temporal threshold. In some such cases, the first frame rate may be higher than second frame rate where an amount of motion detected within the first video stream is higher than an amount of motion detected within the second video stream. In another example, the information particular to the first video stream corresponds to historic participant data associated with a first conference participant represented by the first video stream, and the information particular to the second video stream corresponds to historic participant data associated with a second conference participant represented by the second video stream. In some such cases, determining the first and second frame rates can include accessing a data store to obtain historic participant information associated with users of the first and second participant devices. In yet another example, the information particular to the first video stream corresponds to priority information associated with a user of the first participant device and the information particular to the second video stream corresponds to priority information associated with a user of the second participant device.

The network constraint corresponds to at least one of a total amount of network bandwidth remaining available for connected devices, a total amount of network bandwidth currently in use by connected devices, a limitation on a number of devices which can connect to the local area network, an average amount of bandwidth used by a connected device, or a throughput limitation of one or more network devices which implement the local area network. The network constraint can be determined based on information obtained from at least one of the first participant device or the second participant device. For example, determining the network constraint can include requesting network information associated with the local area network from at least one of the first participant device or the second participant device, and determining the network constraint based on the network information.

At 1308, the first and second participant devices are instructed, during the conference, to capture the first and second video streams at the first and second frame rates, respectively. Instructing the first and second participant devices to capture the first and second video streams at the first and second frame rates includes transmitting data (e.g., instructions) separately to each of the first participant device and the second participant device to cause those devices to adjust the frame rates at which they are capturing the video content of the first video stream and the second video stream, respectively. The capture of the first video stream at the first frame rate configures the first video stream to be rendered at the first frame rate within a first user interface tile of conferencing software and the capture of the second video stream at the second frame rate configures the second video stream to be rendered at the second frame rate within a second user interface tile of the conferencing software.

In some implementations, instructing the first participant device to capture the first video stream at the first frame rate and the second participant device to capture the second video stream at the second frame rate can include determining, based on a successful network evaluation for the local area network, that the first participant device is capable of capturing the first video stream at the first frame rate and that the second participant device is capable of capturing the second video stream at the second frame rate. For example, a network evaluation may be performed as disclosed above with respect to the technique 1200 shown in FIG. 12. In some implementations, instructing the first participant device to capture the first video stream at the first frame rate and the second participant device to capture the second video stream at the second frame rate can include transmitting prompts recommending a frame rate change to each of the first participant device and the second participant device. For example, the first and second participant devices can begin capturing the first and second video streams respectively at the first and second frame rates respectively based on user responses to those prompts at those devices. In some implementations, the first frame rate is determined at a first time during the conference and the second frame rate is determined at a second time during the conference. In such a case, instructing the first participant device to capture the first video stream at the first frame rate and the second participant device to capture the second video stream at the second frame rate can include instructing the first participant device to capture the first video stream at the first frame rate at the first time, and instructing the second participant device to capture the second video stream at the second frame rate at the second time.

In some implementations, the technique 1300 can include incrementally updating at least one of the first frame rate of the second frame rate on a periodic basis according to network information (e.g., network bandwidth for the network to which the video capture device or a physical space device coupled to the video capture device is connected). For example, at least one of the first frame rate or the second frame rate may be updated on a periodic basis during the conference based on the network constraint. In some implementations, the technique 1300 can include updating the first frame rate responsive to an event detected in connection with the first conference participant or the second frame rate responsive to an event detected in connection with the second conference participant. For example, at least one of the first frame rate or the second frame rate may be updated based on the network constraint responsive to an event detected during the conference.

The implementations of this disclosure correspond to methods, non-transitory computer readable media, apparatuses, systems, devices, and the like. In some implementations, a method comprises obtaining, during a conference, a first video stream from a first participant device connected to a local area network and a second video stream from a second participant device connected to the local area network; determining a first frame rate for the first participant device to use based on information particular to the first video stream and based on a network constraint associated with the local area network; determining a second frame rate for the second participant device to use based on information particular to the second video stream and based on the network constraint associated with the local area network; and instructing, during the conference, the first participant device to capture the first video stream at the first frame rate and the second participant device to capture the second video stream at the second frame rate. In some implementations, a non-transitory computer readable medium stores instructions operable to cause one or more processors to perform operations comprising obtaining, during a conference, a first video stream from a first participant device connected to a local area network and a second video stream from a second participant device connected to the local area network; determining a first frame rate for the first participant device to use based on information particular to the first video stream and based on a network constraint associated with the local area network; determining a second frame rate for the second participant device to use based on information particular to the second video stream and based on the network constraint associated with the local area network; and instructing, during the conference, the first participant device to capture the first video stream at the first frame rate and the second participant device to capture the second video stream at the second frame rate. In some implementations, an apparatus comprises a memory and a processor configured to execute instructions stored in the memory to obtain, during a conference, a first video stream from a first participant device connected to a local area network and a second video stream from a second participant device connected to the local area network; determine a first frame rate for the first participant device to use based on information particular to the first video stream and based on a network constraint associated with the local area network; determine a second frame rate for the second participant device to use based on information particular to the second video stream and based on the network constraint associated with the local area network; and instruct, during the conference, the first participant device to capture the first video stream at the first frame rate and the second participant device to capture the second video stream at the second frame rate.

In some implementations of the method, non-transitory computer readable medium, or apparatus, the information particular to the first video stream corresponds to a comparison between video data of the first video stream and one or both of a pixel threshold or a temporal threshold, and the information particular to the second video stream corresponds to a comparison between video data of the second video stream and one or both of the pixel threshold or the temporal threshold.

In some implementations of the method, non-transitory computer readable medium, or apparatus, the information particular to the first video stream corresponds to historic participant data associated with a first conference participant represented by the first video stream, and the information particular to the second video stream corresponds to historic participant data associated with a second conference participant represented by the second video stream.

In some implementations of the method, non-transitory computer readable medium, or apparatus, instructing the first participant device to capture the first video stream at the first frame rate and the second participant device to capture the second video stream at the second frame rate comprises determining, based on a successful network evaluation for the local area network, that the first participant device is capable of capturing the first video stream at the first frame rate and that the second participant device is capable of capturing the second video stream at the second frame rate.

In some implementations of the method, non-transitory computer readable medium, or apparatus, the first frame rate is higher than the second frame rate where an amount of motion detected within the first video stream is higher than an amount of motion detected within the second video stream.

In some implementations of the method, non-transitory computer readable medium, or apparatus, at least one of the first frame rate or the second frame rate is higher than a default frame rate used for initially capturing the first video stream and the second video stream.

In some implementations of the method, non-transitory computer readable medium, or apparatus, the network constraint corresponds to at least one of a total amount of network bandwidth remaining available for connected devices, a total amount of network bandwidth currently in use by connected devices, a limitation on a number of devices which can connect to the local area network, an average amount of bandwidth used by a connected device, or a throughput limitation of one or more network devices which implement the local area network.

In some implementations of the method, non-transitory computer readable medium, or apparatus, the network constraint is determined based on information obtained from at least one of the first participant device or the second participant device.

In some implementations of the method, non-transitory computer readable medium, or apparatus, determining the second frame rate comprises evaluating the information particular to the second video stream and the network constraint against the first frame rate.

In some implementations of the method, non-transitory computer readable medium, or apparatus, the information particular to the first video stream corresponds to motion information determined for the first video stream and the information particular to the second video stream corresponds to motion information determined for the second video stream.

In some implementations of the method, non-transitory computer readable medium, or apparatus, the information particular to the first video stream corresponds to priority information associated with a user of the first participant device and the information particular to the second video stream corresponds to priority information associated with a user of the second participant device.

In some implementations of the method, non-transitory computer readable medium, or apparatus, network information associated with the local area network is requested from at least one of the first participant device or the second participant device; and the network constraint is determined based on the network information.

In some implementations of the method, non-transitory computer readable medium, or apparatus, instructing the first participant device to capture the first video stream at the first frame rate and the second participant device to capture the second video stream at the second frame rate comprises transmitting prompts recommending a frame rate change to each of the first participant device and the second participant device.

In some implementations of the method, non-transitory computer readable medium, or apparatus, determining the first frame rate and the second frame rate comprises evaluating motion information determined for the first and second video streams against at least one of a pixel threshold or a temporal threshold.

In some implementations of the method, non-transitory computer readable medium, or apparatus, determining the first frame rate and the second frame rate comprises accessing a data store to obtain historic participant information associated with users of the first and second participant devices.

In some implementations of the method, non-transitory computer readable medium, or apparatus, the first frame rate is determined at a first time during the conference and the second frame rate is determined at a second time during the conference, and instructing the first participant device to capture the first video stream at the first frame rate and the second participant device to capture the second video stream at the second frame rate comprises instructing the first participant device to capture the first video stream at the first frame rate at the first time; and instructing the second participant device to capture the second video stream at the second frame rate at the second time.

In some implementations of the method, non-transitory computer readable medium, or apparatus, at least one of the first frame rate or the second frame rate is updated on a periodic basis during the conference based on the network constraint.

In some implementations of the method, non-transitory computer readable medium, or apparatus, at least one of the first frame rate or the second frame rate is updated based on the network constraint responsive to an event detected during the conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
  obtaining, during a conference, a first video stream from a first participant device connected to a local area network and a second video stream from a second participant device connected to the local area network;
  determining a first frame rate for the first participant device to use based on information particular to the first video stream and based on a network constraint associated with the local area network;
  determining a second frame rate for the second participant device to use based on information particular to the second video stream and based on the network constraint associated with the local area network; and
  instructing, during the conference, the first participant device to capture the first video stream at the first frame rate and the second participant device to capture the second video stream at the second frame rate.

2. The method of claim 1, wherein the information particular to the first video stream corresponds to a comparison between video data of the first video stream and one or both of a pixel threshold or a temporal threshold, and wherein the information particular to the second video stream corresponds to a comparison between video data of the second video stream and one or both of the pixel threshold or the temporal threshold.

3. The method of claim 1, wherein the information particular to the first video stream corresponds to historic participant data associated with a first conference participant represented by the first video stream, and wherein the information particular to the second video stream corresponds to historic participant data associated with a second conference participant represented by the second video stream.

4. The method of claim 1, wherein instructing the first participant device to capture the first video stream at the first frame rate and the second participant device to capture the second video stream at the second frame rate comprises:
  determining, based on a successful network evaluation for the local area network, that the first participant device is capable of capturing the first video stream at the first frame rate and that the second participant device is capable of capturing the second video stream at the second frame rate.

5. The method of claim 1, wherein the first frame rate is higher than the second frame rate where an amount of motion detected within the first video stream is higher than an amount of motion detected within the second video stream.

6. The method of claim 1, wherein at least one of the first frame rate or the second frame rate is higher than a default frame rate used for initially capturing the first video stream and the second video stream.

7. The method of claim 1, wherein the network constraint corresponds to at least one of a total amount of network bandwidth remaining available for connected devices, a total amount of network bandwidth currently in use by connected devices, a limitation on a number of devices which can connect to the local area network, an average amount of bandwidth used by a connected device, or a throughput limitation of one or more network devices which implement the local area network.

8. The method of claim 1, comprising:
  determining the network constraint based on information obtained from at least one of the first participant device or the second participant device.

9. A non-transitory computer readable medium storing instructions operable to cause one or more processors to perform operations comprising:
  obtaining, during a conference, a first video stream from a first participant device connected to a local area network and a second video stream from a second participant device connected to the local area network;
  determining a first frame rate for the first participant device to use based on information particular to the first video stream and based on a network constraint associated with the local area network;
  determining a second frame rate for the second participant device to use based on information particular to the second video stream and based on the network constraint associated with the local area network; and
  instructing, during the conference, the first participant device to capture the first video stream at the first frame rate and the second participant device to capture the second video stream at the second frame rate.

10. The non-transitory computer readable medium of claim 9, wherein determining the second frame rate comprises:
  evaluating the information particular to the second video stream and the network constraint against the first frame rate.

11. The non-transitory computer readable medium of claim 9, wherein the information particular to the first video stream corresponds to motion information determined for the first video stream and the information particular to the second video stream corresponds to motion information determined for the second video stream.

12. The non-transitory computer readable medium of claim 9, wherein the information particular to the first video stream corresponds to priority information associated with a user of the first participant device and the information particular to the second video stream corresponds to priority information associated with a user of the second participant device.

13. The non-transitory computer readable medium of claim 9, the operations comprising:
  requesting network information associated with the local area network from at least one of the first participant device or the second participant device; and
  determining the network constraint based on the network information.

14. The non-transitory computer readable medium of claim 9, wherein instructing the first participant device to capture the first video stream at the first frame rate and the second participant device to capture the second video stream at the second frame rate comprises:
  transmitting prompts recommending a frame rate change to each of the first participant device and the second participant device.

15. An apparatus, comprising:
  a memory; and
  a processor configured to execute instructions stored in the memory to:
    obtain, during a conference, a first video stream from a first participant device connected to a local area network and a second video stream from a second participant device connected to the local area network;
    determine a first frame rate for the first participant device to use based on information particular to the first video stream and based on a network constraint associated with the local area network;
    determine a second frame rate for the second participant device to use based on information particular to the second video stream and based on the network constraint associated with the local area network; and
    instruct, during the conference, the first participant device to capture the first video stream at the first frame rate and the second participant device to capture the second video stream at the second frame rate.

16. The apparatus of claim 15, wherein, to determine the first frame rate and to determine the second frame rate, the processor is configured to execute the instructions to:
  evaluate motion information determined for the first and second video streams against at least one of a pixel threshold or a temporal threshold.

17. The apparatus of claim 15, wherein, to determine the first frame rate and to determine the second frame rate, the processor is configured to execute the instructions to:
  access a data store to obtain historic participant information associated with users of the first and second participant devices.

18. The apparatus of claim 15, wherein the first frame rate is determined at a first time during the conference and the second frame rate is determined at a second time during the conference, wherein, to instruct the first participant device to capture the first video stream at the first frame rate and the second participant device to capture the second video stream at the second frame rate, the processor is configured to execute the instructions to:
  instruct the first participant device to capture the first video stream at the first frame rate at the first time; and
  instruct the second participant device to capture the second video stream at the second frame rate at the second time.

19. The apparatus of claim 15, wherein the processor is configured to execute the instructions to:
    update at least one of the first frame rate or the second frame rate on a periodic basis during the conference based on the network constraint.

20. The apparatus of claim 15, wherein the processor is configured to execute the instructions to:
    update at least one of the first frame rate or the second frame rate based on the network constraint responsive to an event detected during the conference.

\* \* \* \* \*